(12) United States Patent
Kadotani et al.

(10) Patent No.: US 10,353,278 B2
(45) Date of Patent: Jul. 16, 2019

(54) PROJECTOR COOLING FINS IMPROVING EFFICIENCY AND QUIETNESS

(71) Applicant: SEIKO EPSON CORPORATION, Tokyo (JP)

(72) Inventors: Norikazu Kadotani, Matsumoto (JP); Keita Tsukioka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/541,446

(22) PCT Filed: Dec. 9, 2015

(86) PCT No.: PCT/JP2015/006147
§ 371 (c)(1),
(2) Date: Jul. 3, 2017

(87) PCT Pub. No.: WO2016/110900
PCT Pub. Date: Jul. 14, 2016

(65) Prior Publication Data
US 2017/0357149 A1    Dec. 14, 2017

(30) Foreign Application Priority Data
Jan. 6, 2015   (JP) ................................. 2015-000743

(51) Int. Cl.
| G03B 21/16 | (2006.01) |
| G03B 21/14 | (2006.01) |
| H04N 9/31 | (2006.01) |
| G03B 21/00 | (2006.01) |
| G03B 33/12 | (2006.01) |

(52) U.S. Cl.
CPC ............ *G03B 21/145* (2013.01); *G03B 21/16* (2013.01); *H04N 9/3144* (2013.01); *G03B 21/006* (2013.01); *G03B 33/12* (2013.01)

(58) Field of Classification Search
CPC .............................. H04N 9/3144; G03B 21/16
See application file for complete search history.

(56) References Cited

U.S. PATENT DOCUMENTS

| 4,699,322 | A | 10/1987 | Jobst | |
| 6,345,896 | B1 * | 2/2002 | Kurosawa | G03B 21/16 349/5 |
| 7,086,740 | B2 * | 8/2006 | Sample | G03B 21/16 348/748 |

(Continued)

FOREIGN PATENT DOCUMENTS

| JP | 2004-264386 A | 9/2004 |
| JP | 2009-063671 A | 3/2009 |
| JP | 2010-038975 A | 2/2010 |

OTHER PUBLICATIONS

Mar. 18, 2016 International Search Report issued in International Patent Application No. PCT/JP2015/006147.

*Primary Examiner* — Bao-Luan Q Le
(74) *Attorney, Agent, or Firm* — Oliff PLC

(57) ABSTRACT

A projector includes an exterior housing including an exhaust port and a cooling device provided in the exterior housing and configured to discharge the air, which has cooled a cooling target, to the outside of the exterior housing via the exhaust port. The exterior housing includes a partition member that partitions the exhaust port and forms a plurality of openings. The partition member includes projecting sections projecting from an end edge of at least one of the plurality of openings into the opening.

8 Claims, 16 Drawing Sheets

(56) References Cited

U.S. PATENT DOCUMENTS

| | | | |
|---|---|---|---|
| 7,140,734 B2 * | 11/2006 | Lim | G03B 21/16 348/748 |
| 7,226,352 B2 | 6/2007 | Oh | |
| 7,309,131 B2 * | 12/2007 | Asada | G03B 21/20 348/748 |
| 7,926,954 B2 * | 4/2011 | Lu | G03B 21/16 353/61 |
| 8,955,990 B2 * | 2/2015 | Morohoshi | G03B 21/145 353/119 |
| 9,028,077 B2 * | 5/2015 | Morohoshi | G03B 21/145 353/119 |
| 2003/0063464 A1 | 4/2003 | Gulliksen | |
| 2004/0263799 A1 * | 12/2004 | Lim | G03B 21/16 353/61 |
| 2005/0001988 A1 * | 1/2005 | Sample | G03B 21/16 353/52 |
| 2006/0290894 A1 * | 12/2006 | Asada | G03B 21/20 353/58 |
| 2009/0051885 A1 * | 2/2009 | Lu | F21V 11/02 353/97 |
| 2010/0045941 A1 | 2/2010 | Chen | |
| 2013/0050657 A1 * | 2/2013 | Morohoshi | G03B 21/145 353/52 |
| 2013/0050658 A1 * | 2/2013 | Morohoshi | G03B 21/145 353/57 |
| 2013/0050664 A1 * | 2/2013 | Morohoshi | G03B 21/145 353/119 |
| 2013/0249959 A1 * | 9/2013 | Umehara | H04N 7/142 345/690 |
| 2014/0204348 A1 * | 7/2014 | Matsumiya | G03B 21/16 353/61 |

\* cited by examiner

[Fig. 1]
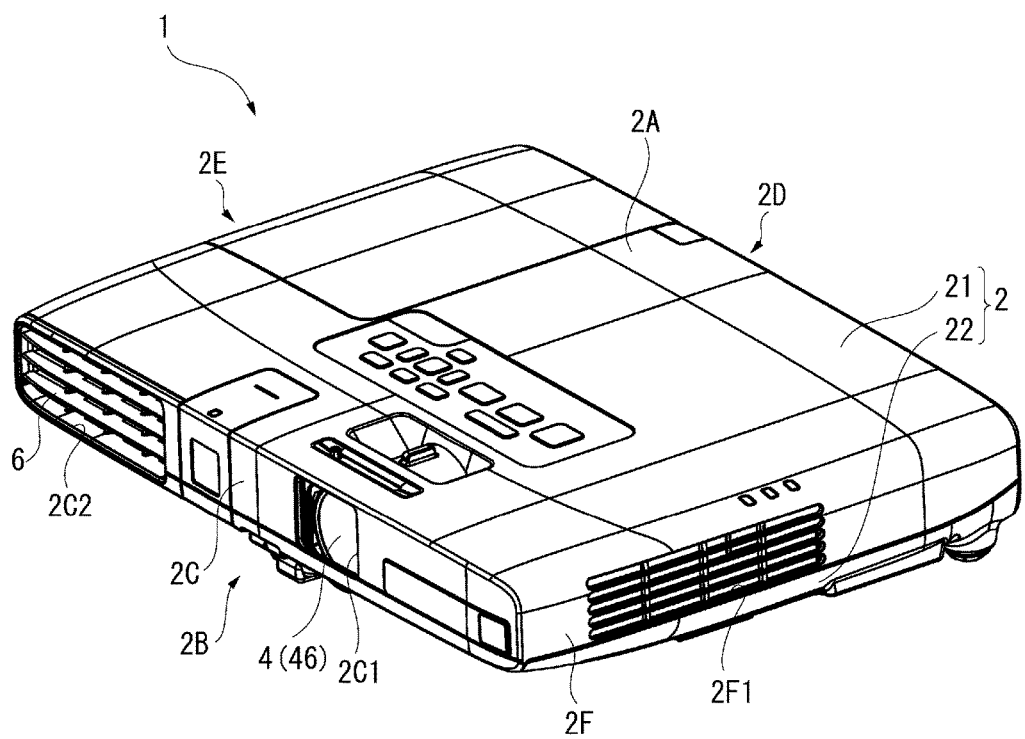

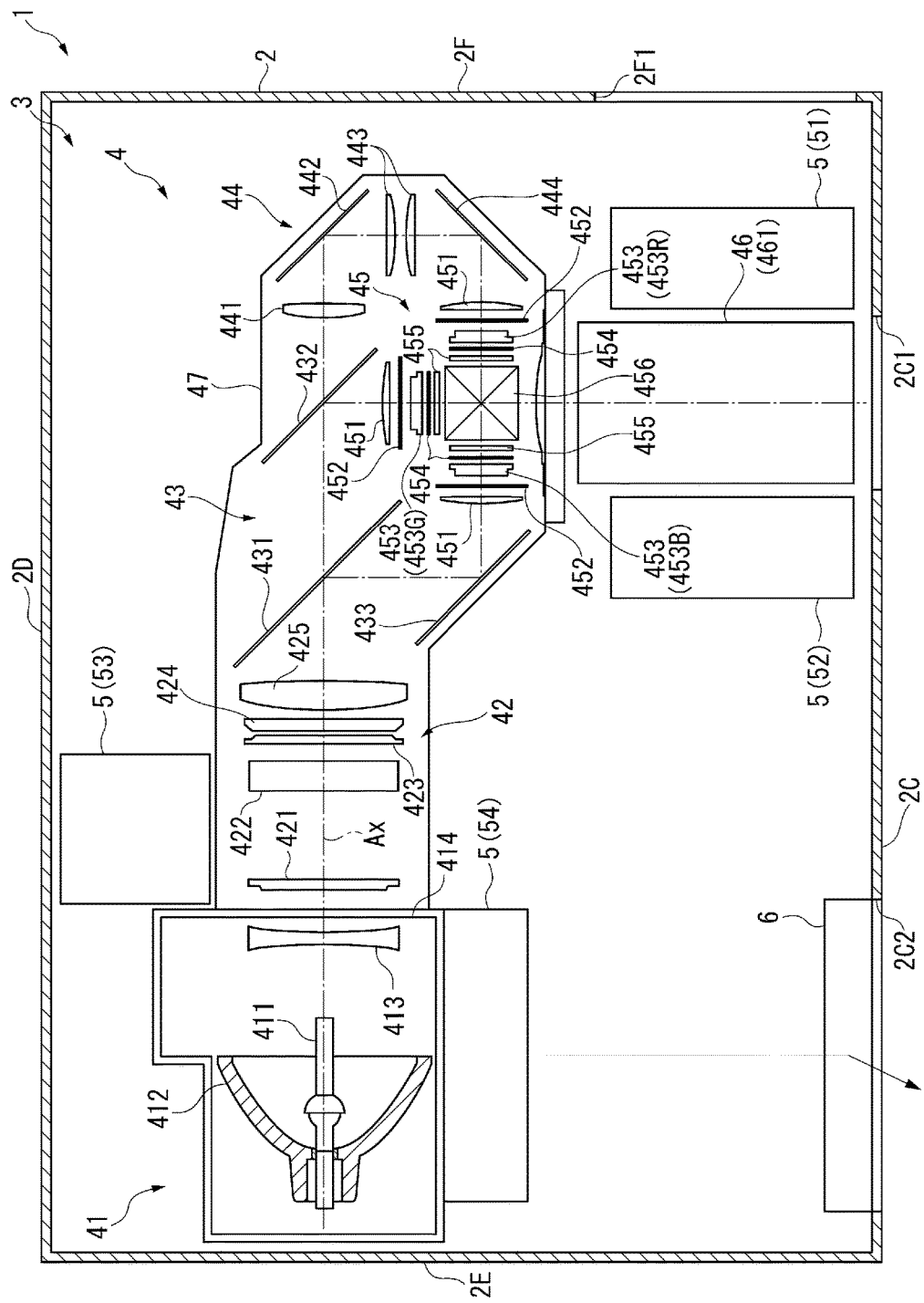
[Fig. 2]

[Fig. 3]
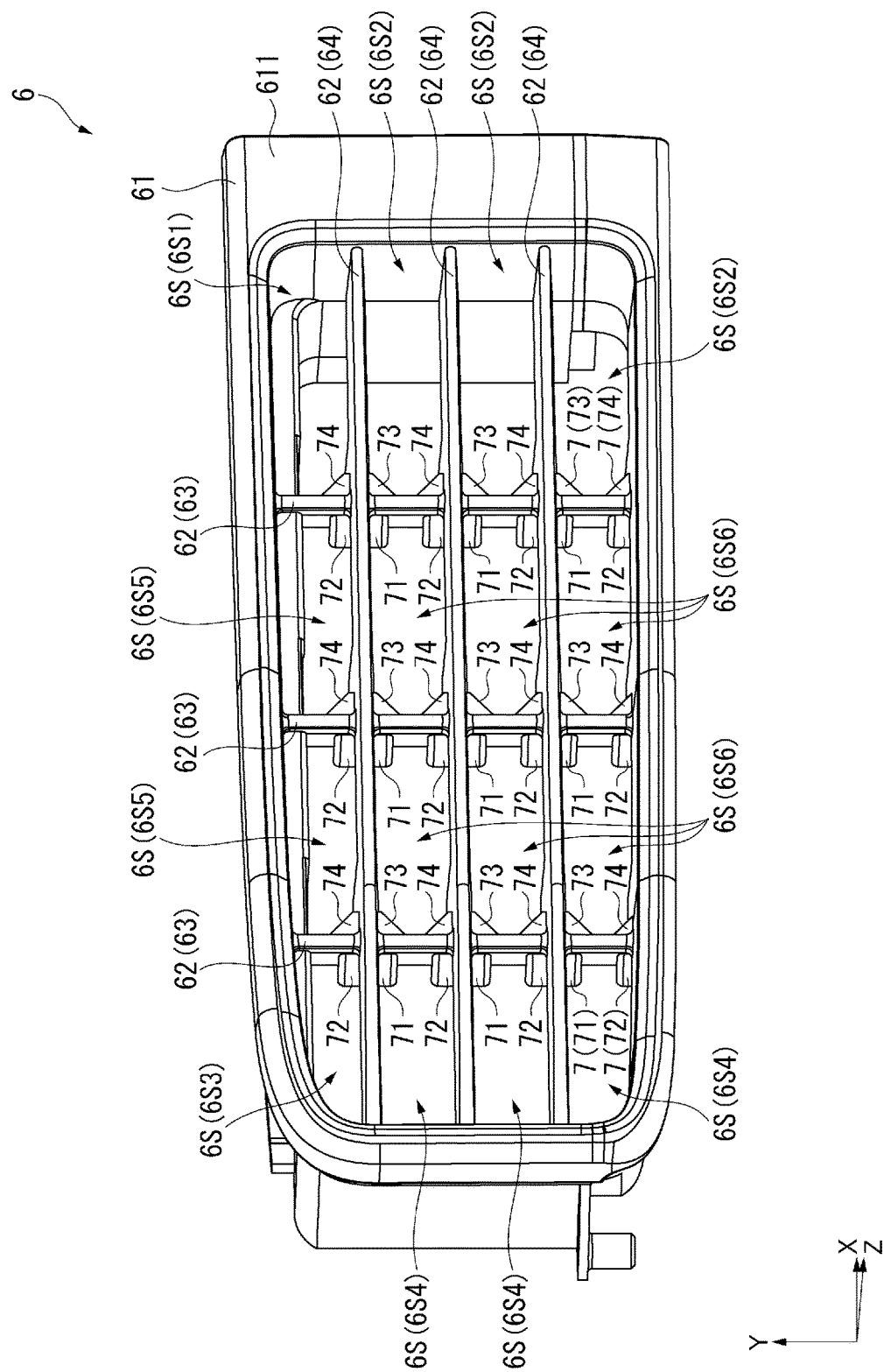

[Fig. 4]
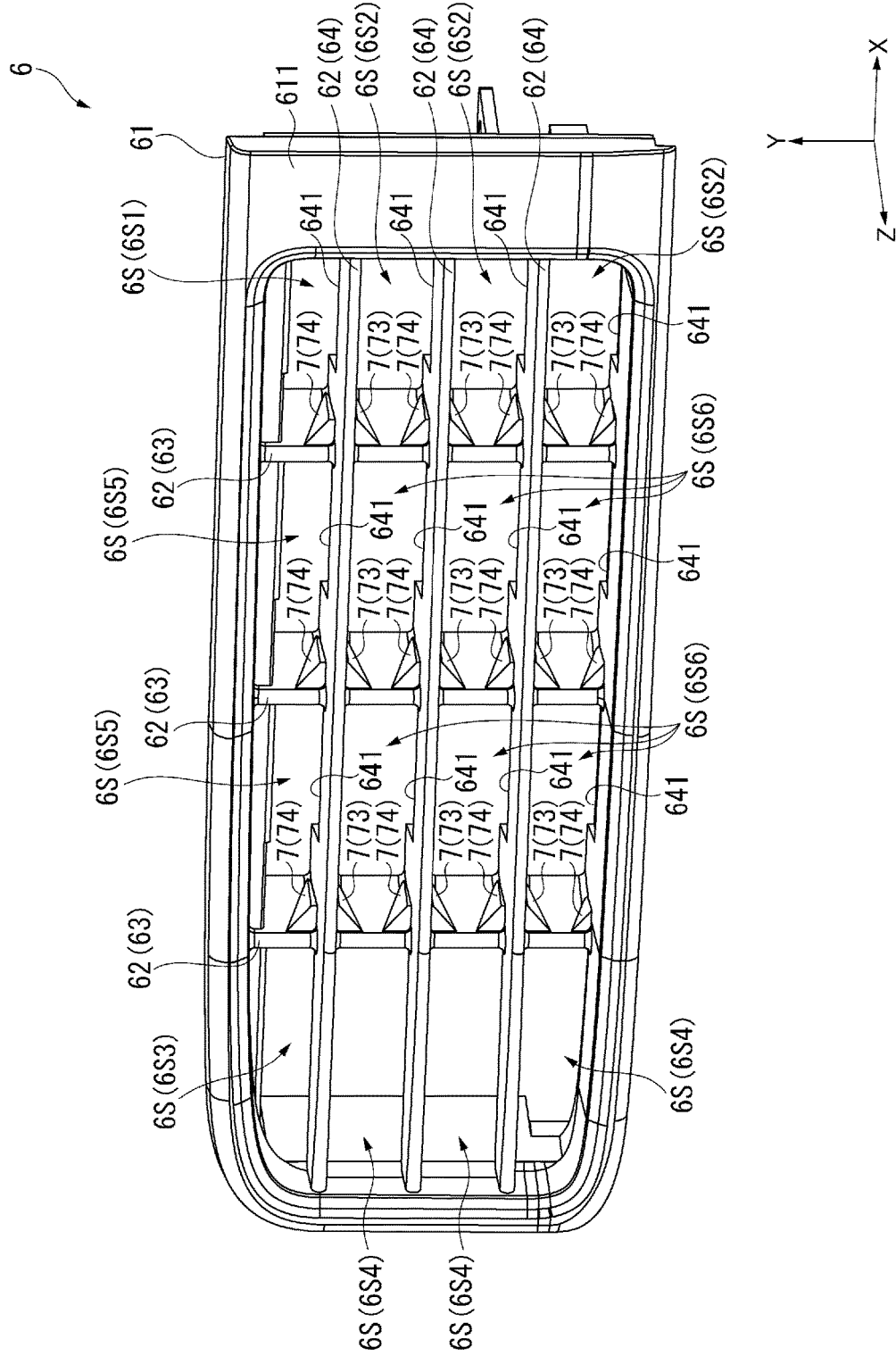

[Fig. 5]
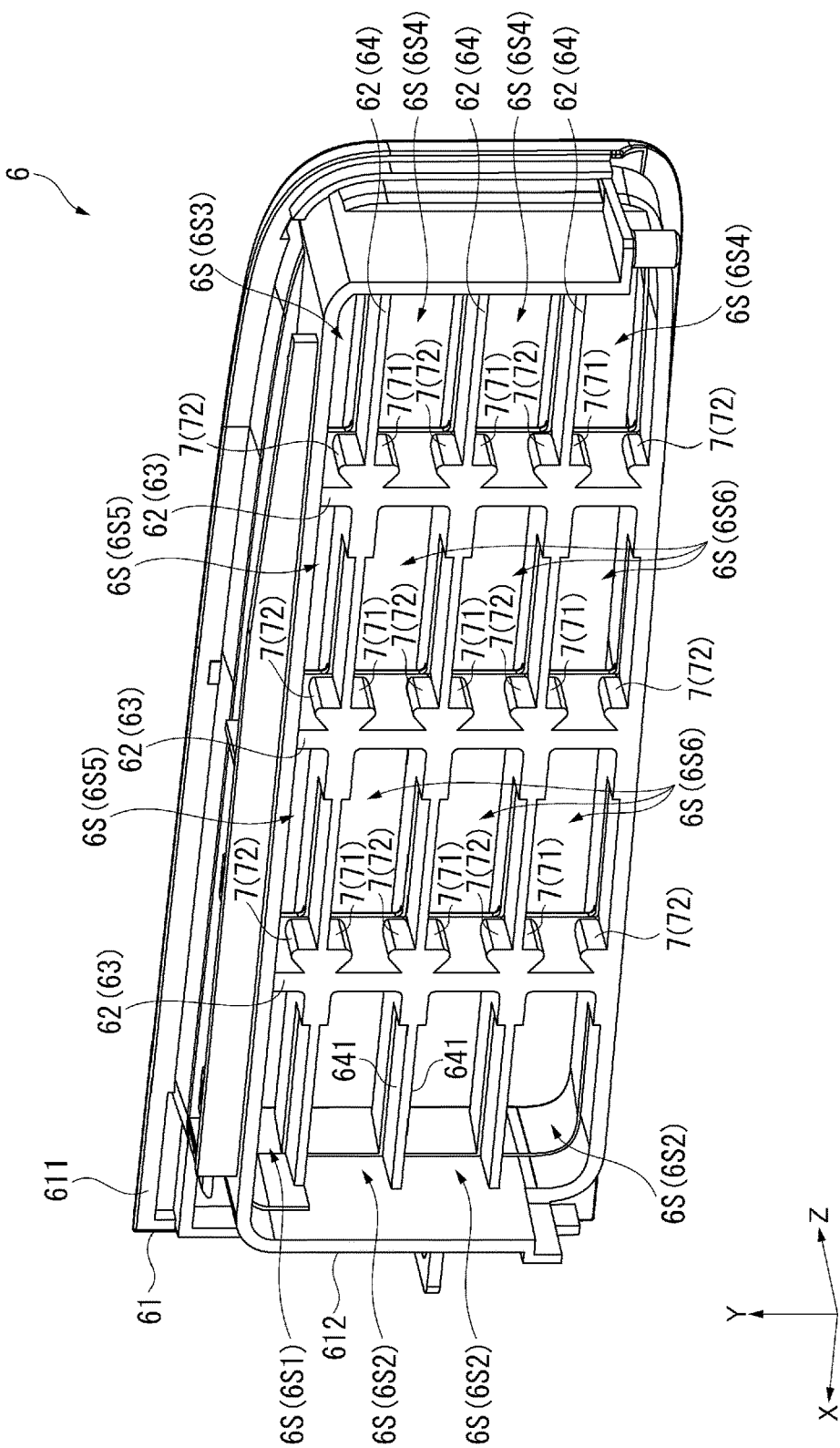

[Fig. 6]
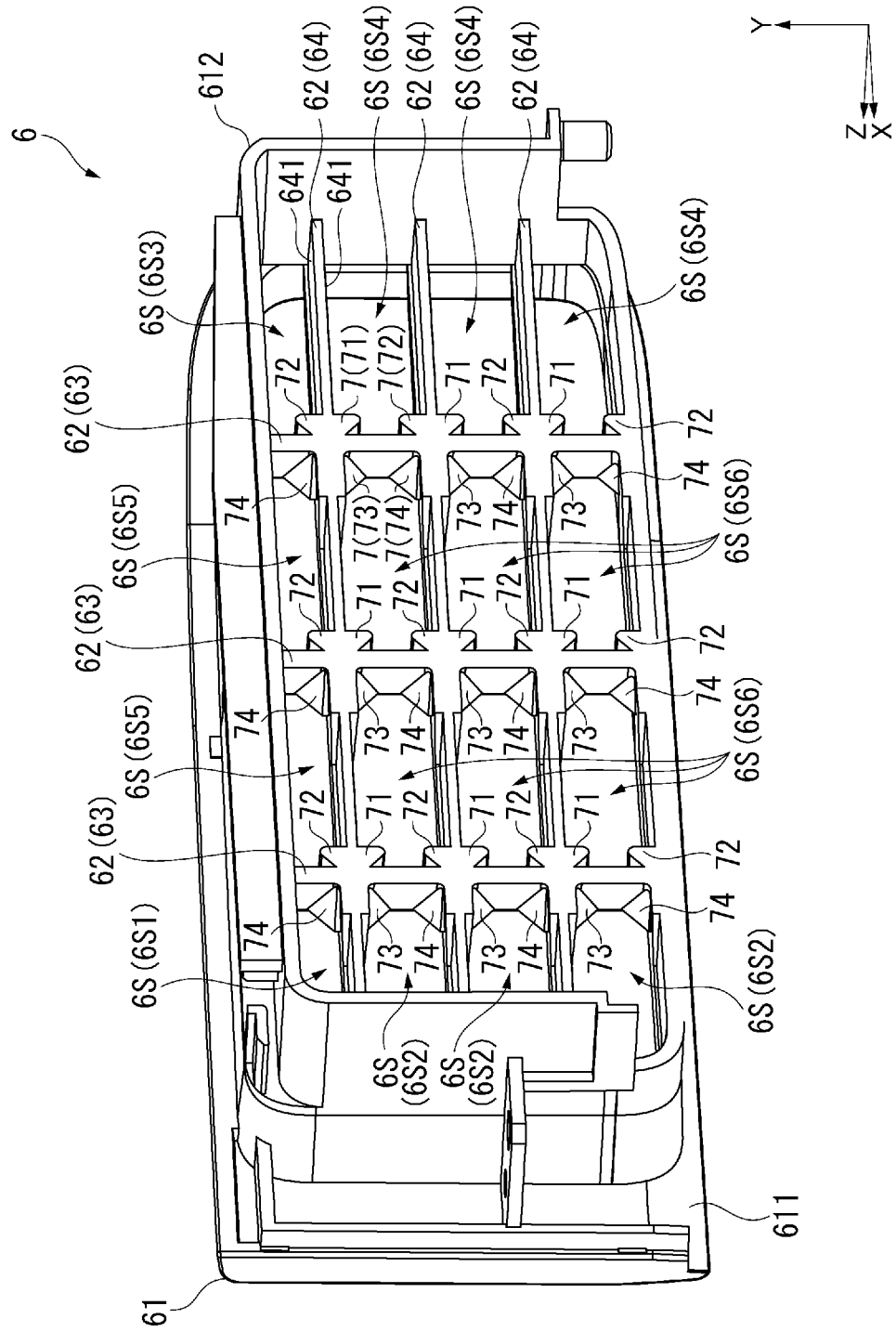

[Fig. 7]
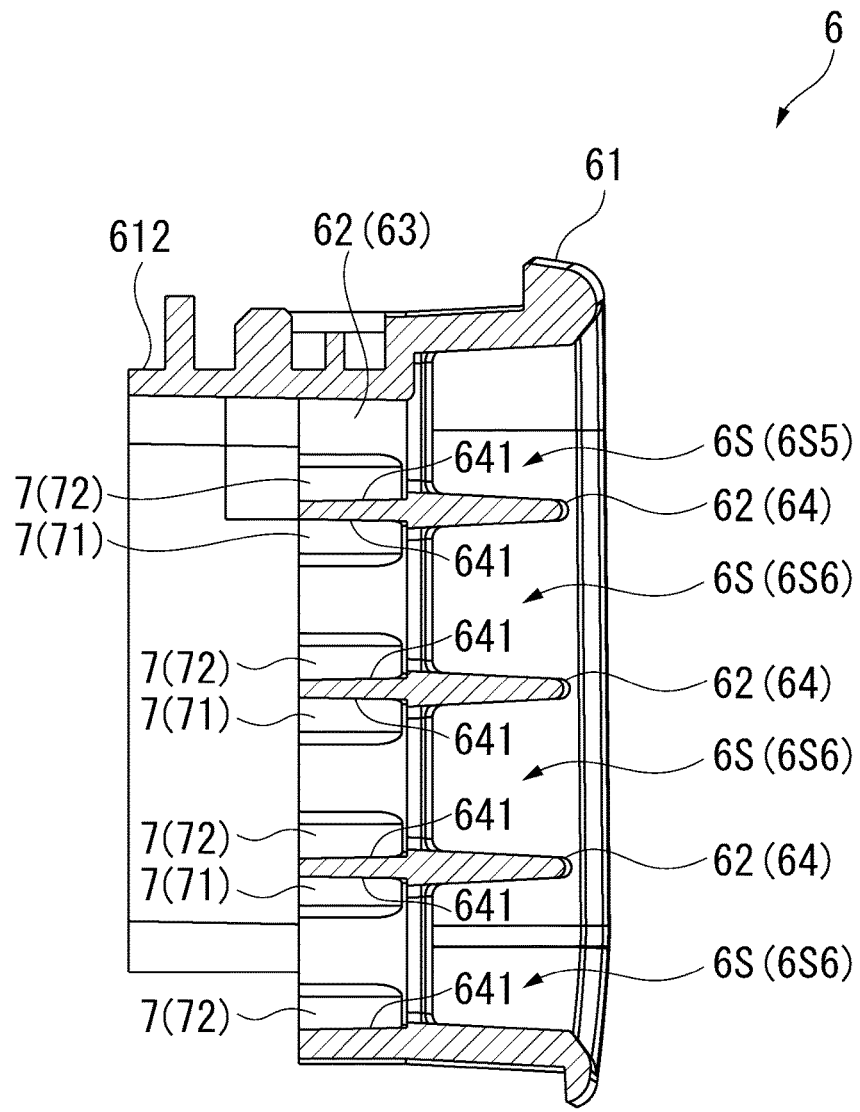
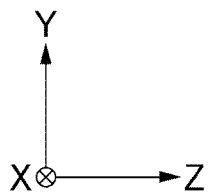

[Fig. 8]
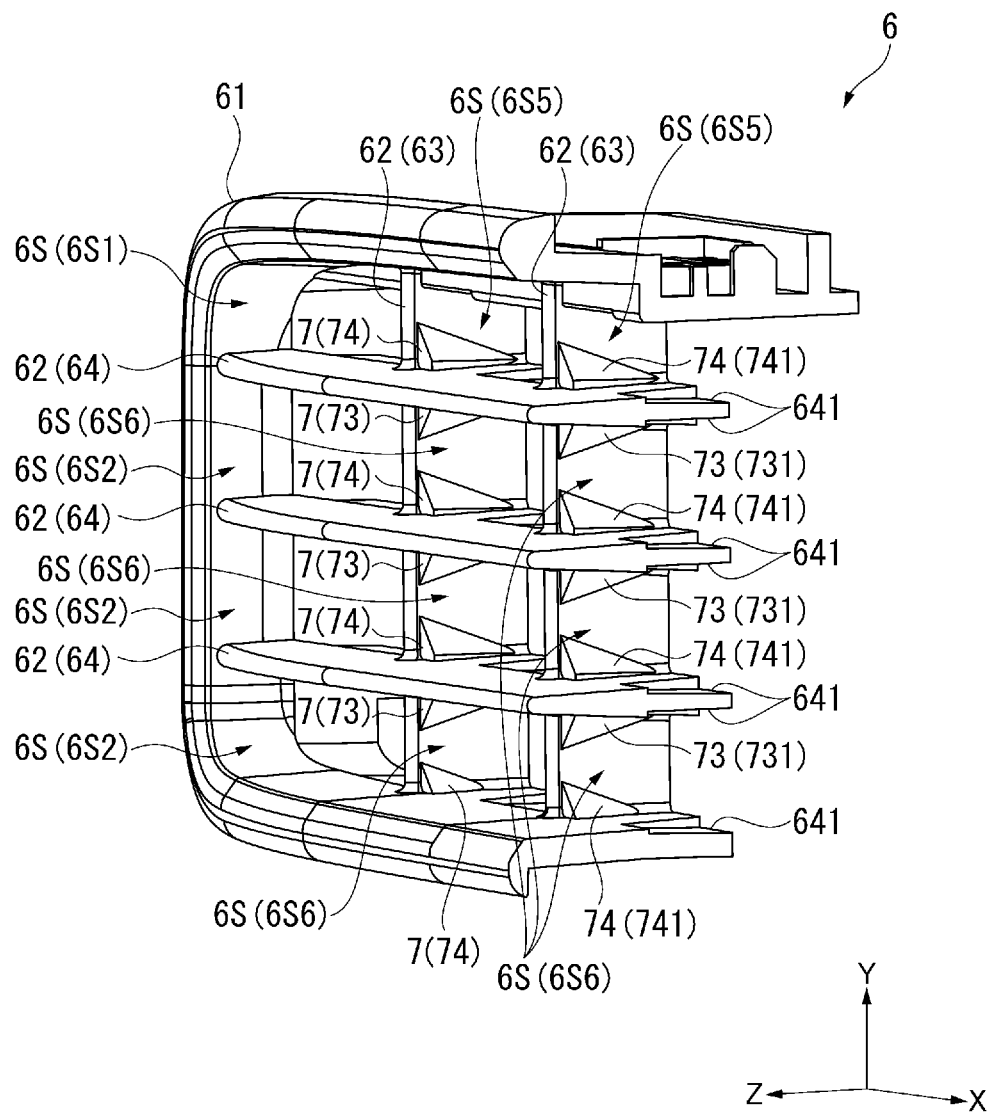

[Fig. 9]
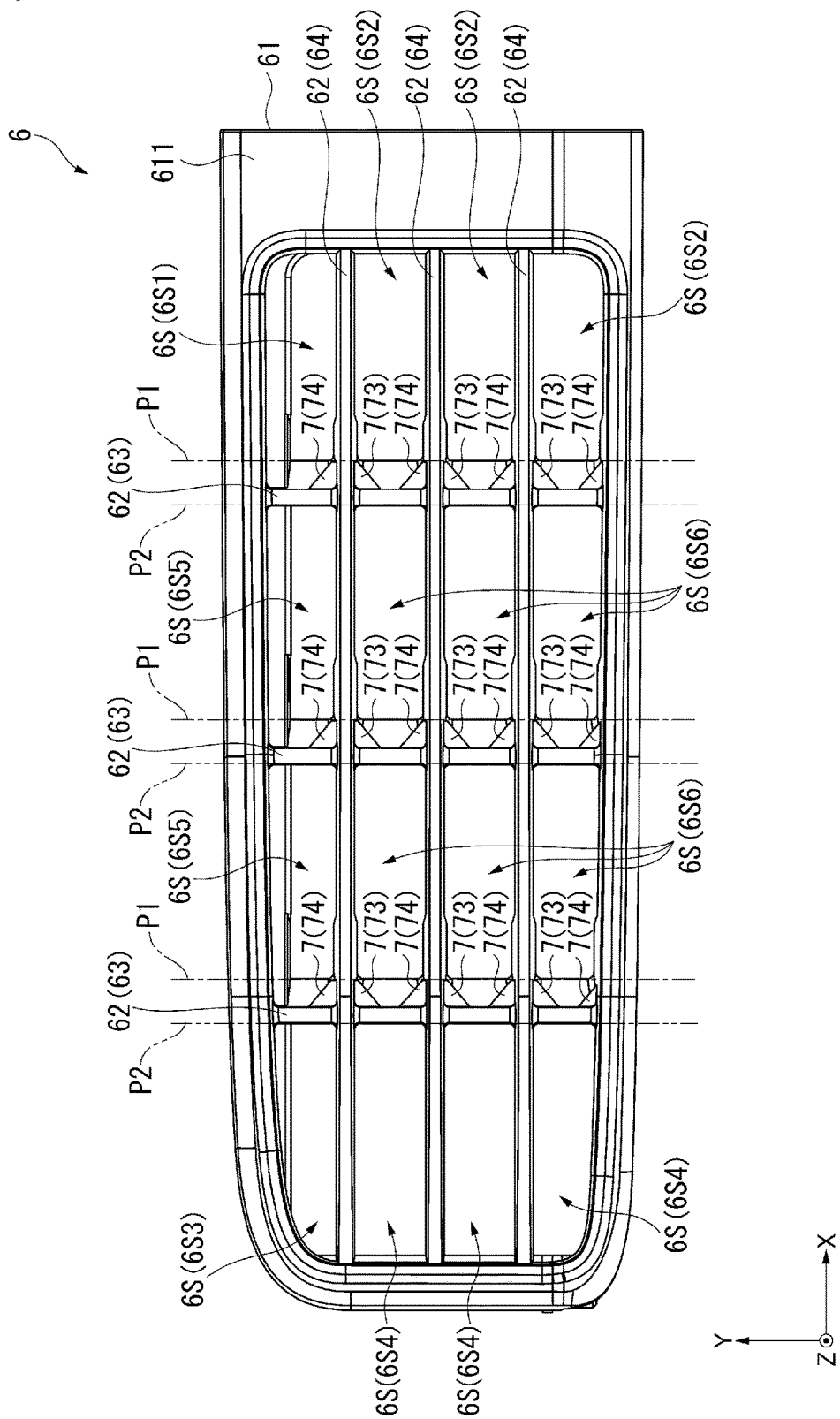

[Fig. 10]
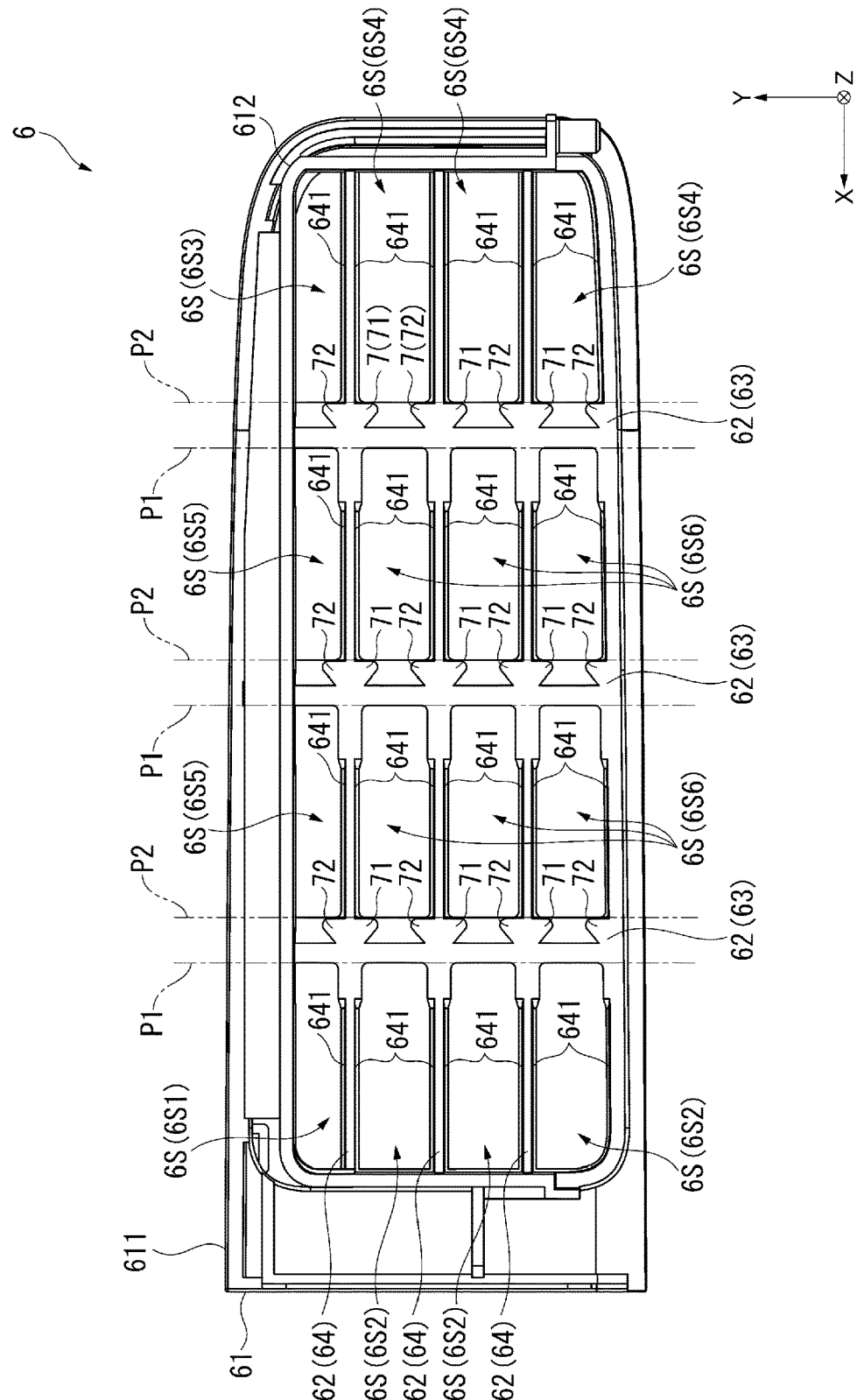

[Fig. 11]
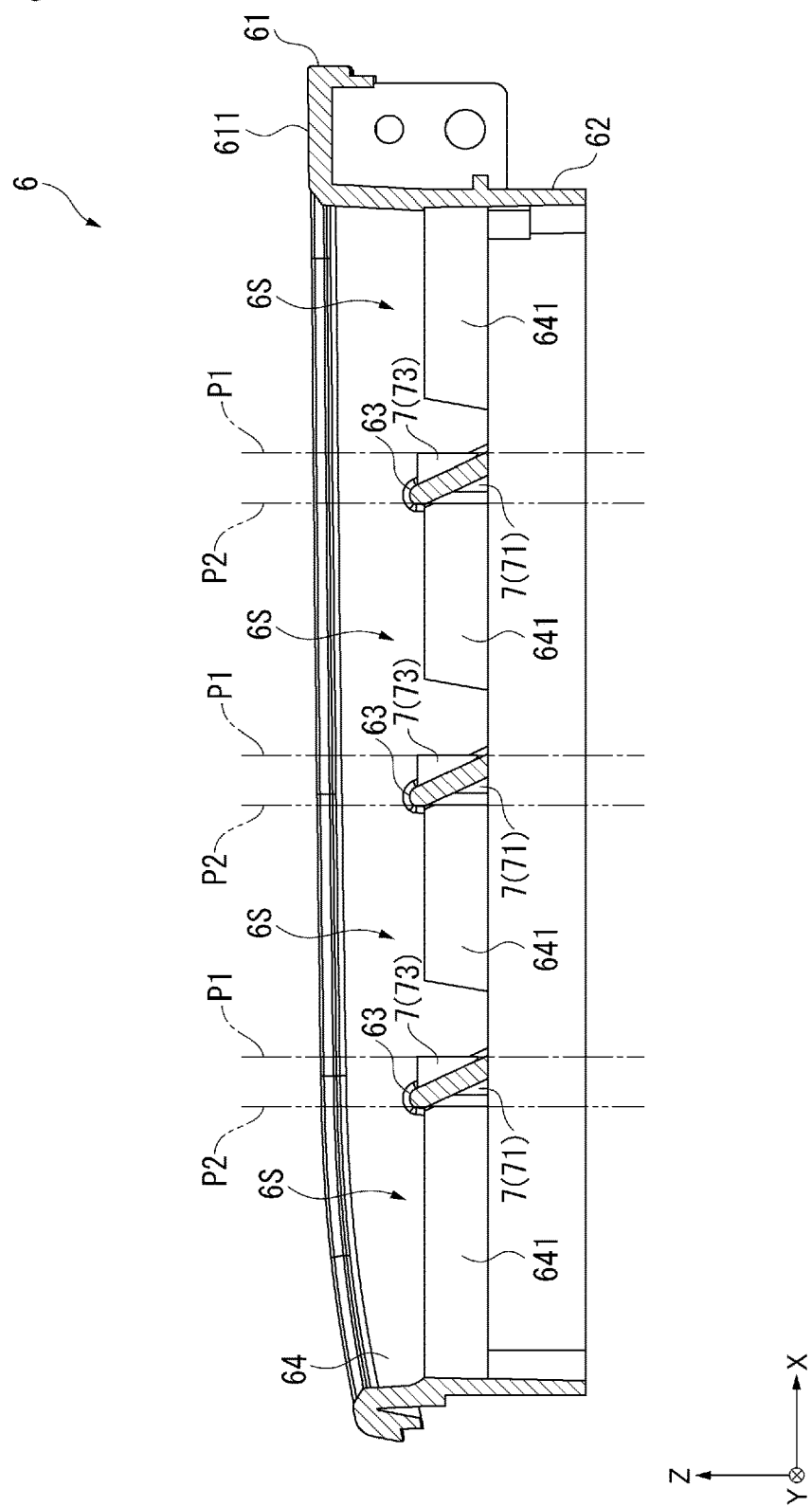

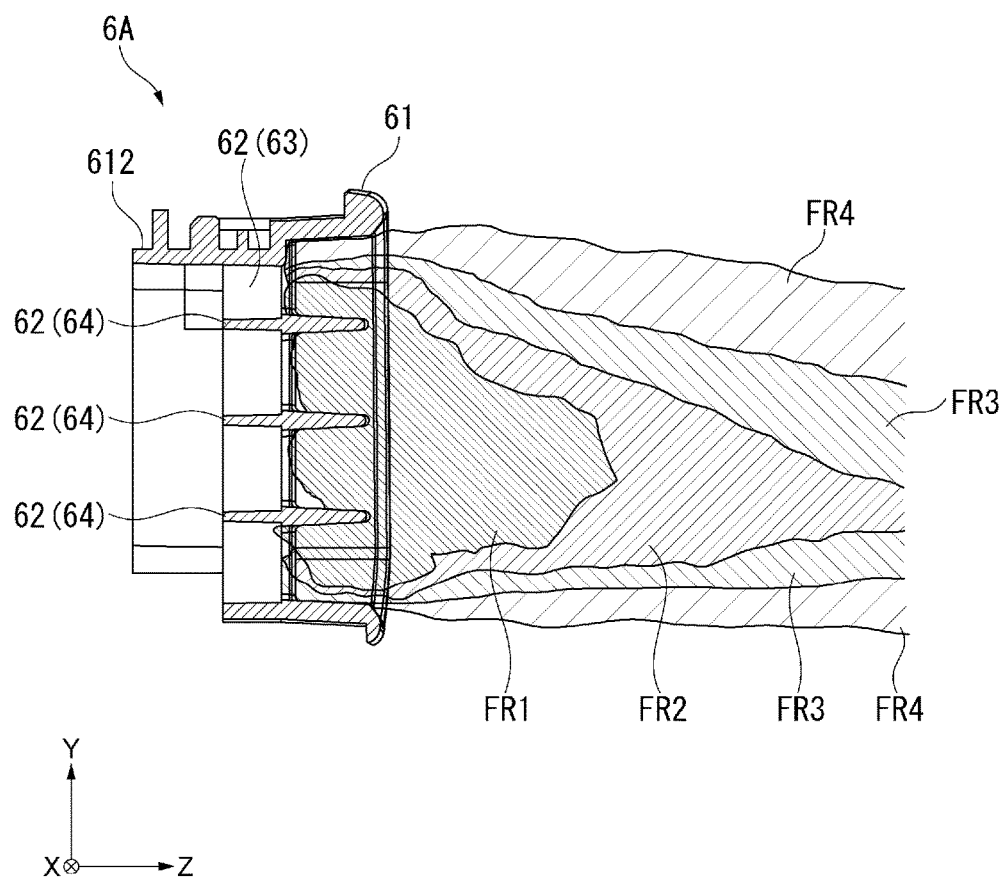
[Fig. 12]

[Fig. 13]
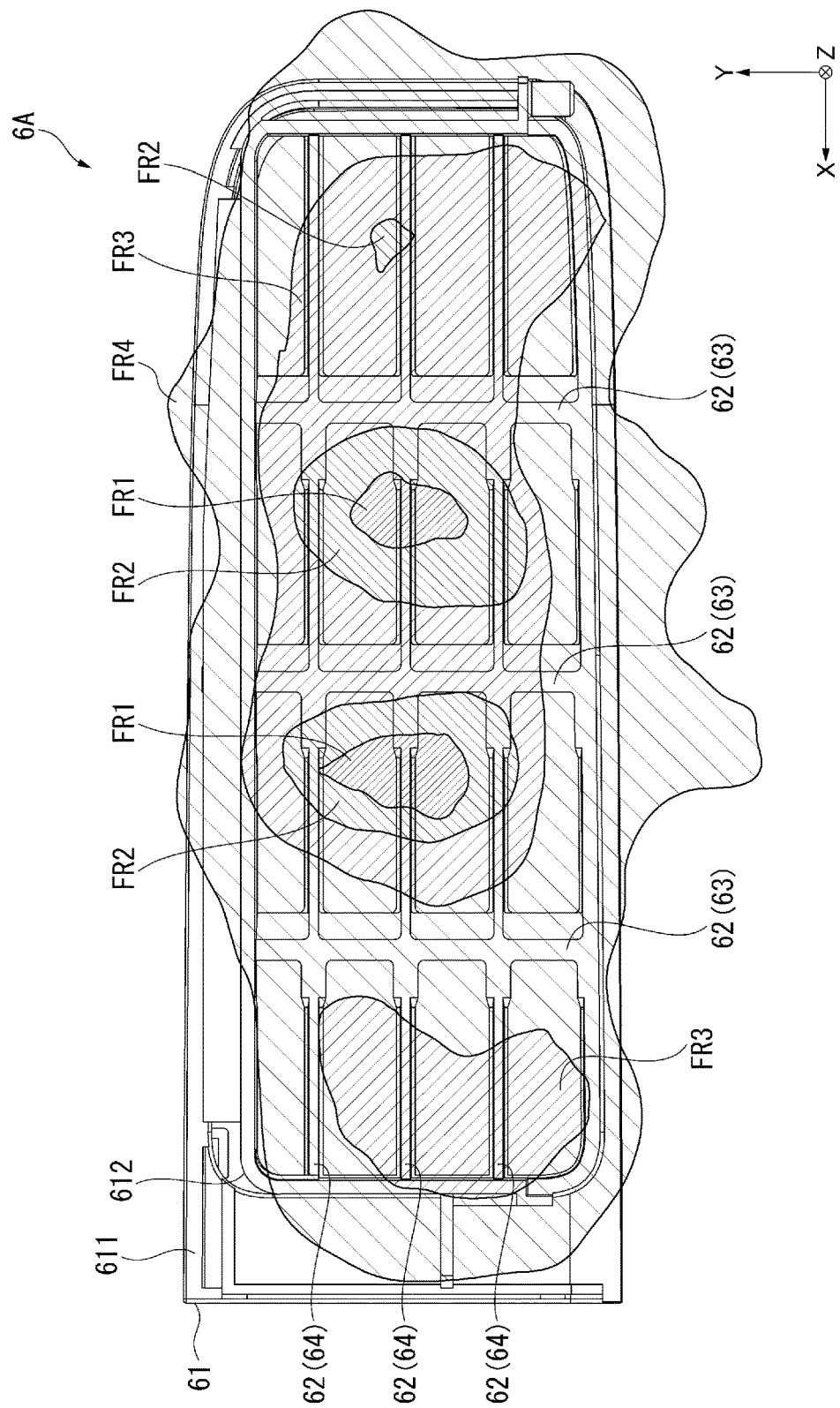

[Fig. 14]
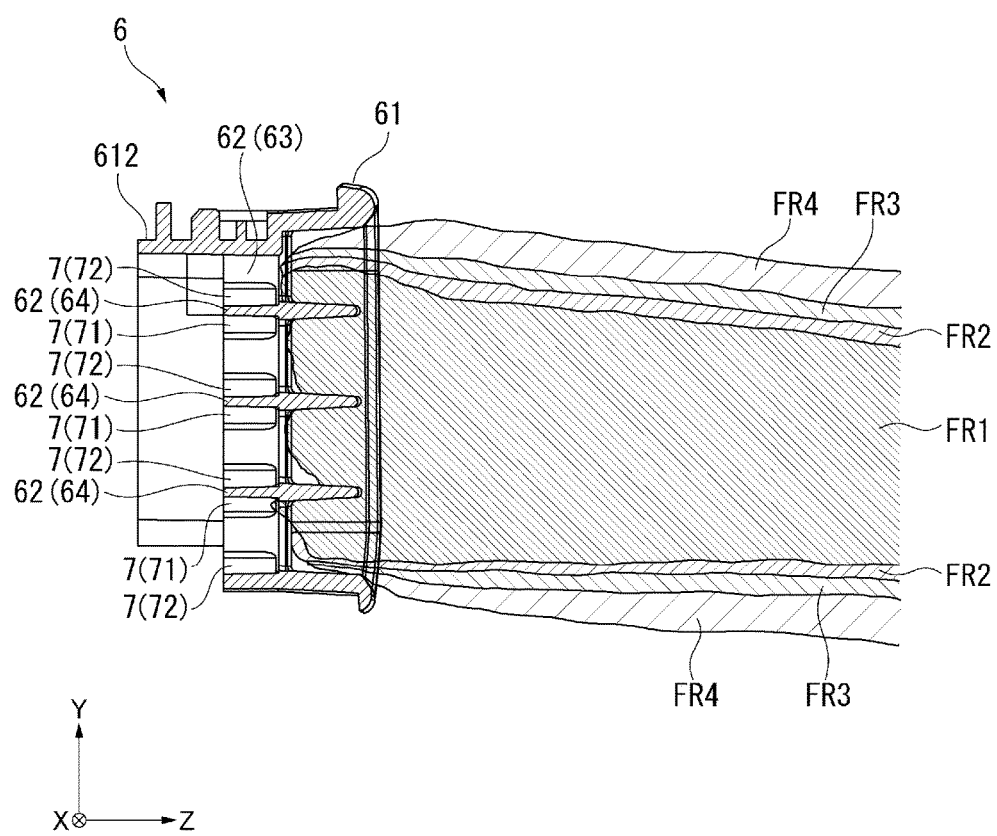

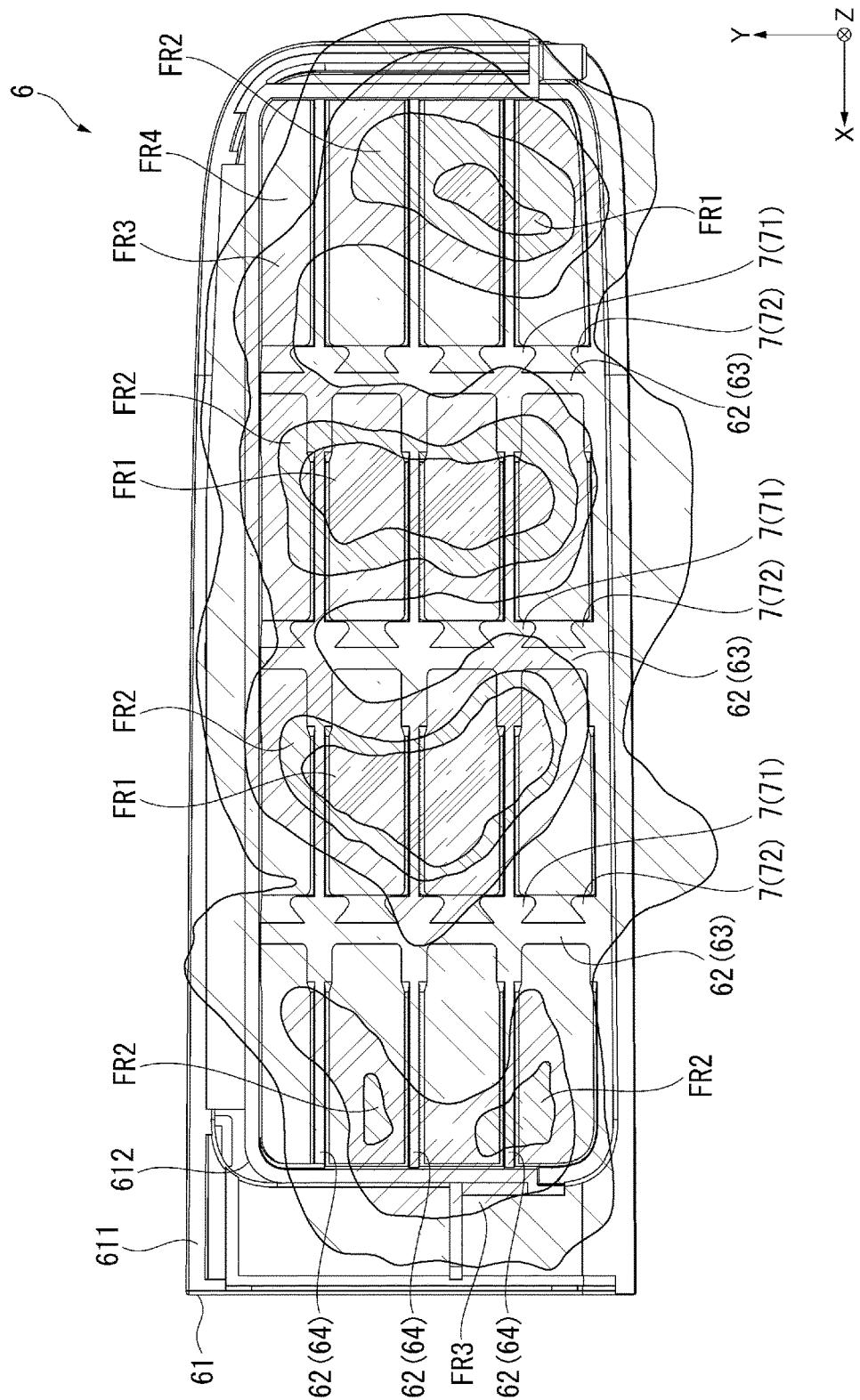
[Fig. 15]

[Fig. 16]
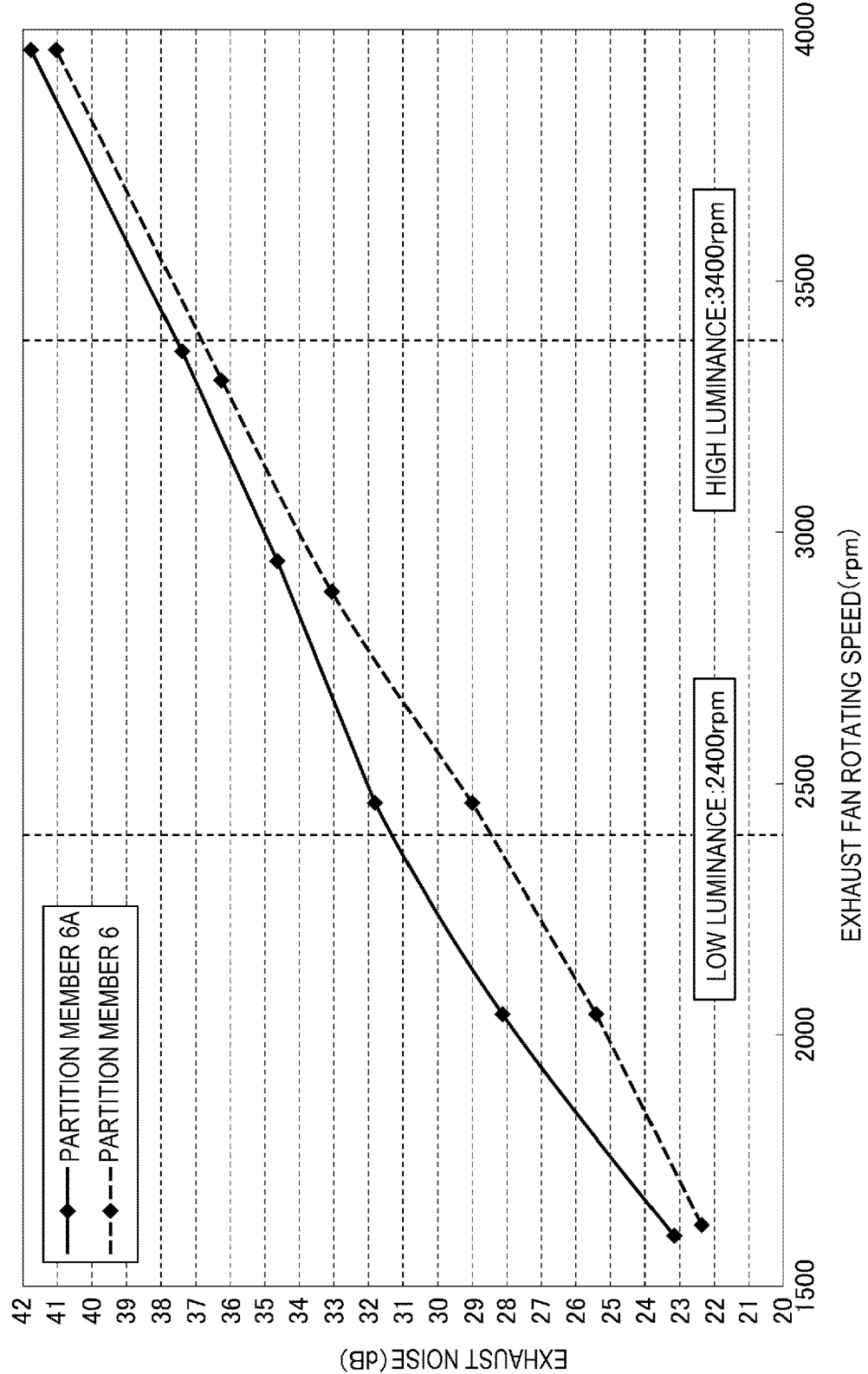

US 10,353,278 B2

PROJECTOR COOLING FINS IMPROVING EFFICIENCY AND QUIETNESS

CROSS REFERENCE TO RELATED APPLICATION

The entire disclosure of Japanese Patent Application No. 2015-000743, filed Jan. 6 2015 is expressly incorporated by reference herein

TECHNICAL FIELD

The present invention relates to a projector.

BACKGROUND ART

There has been known a projector including a light source device, a light modulating device that modulates light emitted from the light source device and forms an image corresponding to image information, and a projection optical device that projects the formed image. As such a projector, there has been known a projector including a light source device including a light source lamp such as an ultra-high pressure mercury lamp.

Incidentally, the temperature of the light source lamp reaches extremely high temperature when the light source lamp is lit. On the other hand, unless the light source lamp is appropriately cooled, devitrification and blackening occur and the life of the light source lamp is reduced. Therefore, there has been proposed a projector including a cooling device that cools the light source lamp (see, for example, PTL 1).

In the projector described in PTL 1, the cooling device includes four fans. Two fans among the four fans blow the air introduced from the outside to an optical device including a liquid crystal panel functioning as a light modulating device and cool the optical device. Another fan blows the air introduced into an exterior housing of the projector to a light source device and cools the light source device. Further, still another fan sucks the air, which has cooled the light source device, and discharges the air to the outside of the exterior housing via an exhaust port formed on the front surface of the exterior housing.

The light modulating device and the light source device can be suitably cooled by such a cooling device.

CITATION LIST

Patent Literature

PTL 1: JP-A-2010-038975

SUMMARY OF INVENTION

Technical Problem

In recent years, in a projector, a light source device that emits high-luminance light is adopted to attain an increase in luminance. In such a projector, since the temperature of heat generated in the light source device also rises, it is conceivable to increase rotating speed of the fans to increase an air blow amount of the air to the light source device and increase a discharge amount of the air, which has cooled the light source device, to thereby efficiently cool the light source device.

However, when the rotating speed of the fans disposed on the inner side of the exhaust port formed in the exterior housing of the projector increases, wind noise of the air discharged from the exhaust port increases. On the other hand, when the positions of the fans are moved away from the exhaust port, there is a problem in that discharge efficiency of the air, which has cooled a heat generation source such as the light source device, is deteriorated and heat tends to be accumulated in the exterior housing. Therefore, there is a demand for a configuration that can reduce noise such as exhaust sound.

Solution to Problem

An advantage of some aspects of the invention is to solve at least a part of the problems and provide a projector that can reduce noise.

A projector according to an aspect of the invention includes: an exterior housing including an exhaust port; and a cooling device provided in the exterior housing and configured to discharge the air, which has cooled a cooling target, to the outside of the exterior housing via the exhaust port. The exterior housing includes a partition member that partitions the exhaust port and forms a plurality of openings. The partition member includes projecting sections projecting from an end edge of at least one of the plurality of openings into the opening.

According to the aspect, when the air delivered from the cooling device circulates through the plurality of openings formed by partitioning the exhaust port with the partition member, a small swirl (a turbulent flow) of the air can be caused by the projecting sections projecting into the opening. The air circulates through the opening into which the projecting sections project, whereby a plurality of the small swirls of the air can be generated. Consequently, compared with when the air circulates through the plurality of openings without the projecting sections and a large swirl is generated, air sound can be reduced. Therefore, exhaust noise of the projector can be reduced.

The small swirl of the air is generated by the projecting sections, whereby resistance at the time when the air passes the openings is reduced. Consequently, it is possible to suppress the flow velocity of the air passing the plurality of openings from being reduced and increase a flow rate (an air volume) of the air discharged to the outside of the exterior housing. Therefore, it is possible to increase discharge efficiency of the air, which has cooled the cooling target, and effectively cool the cooling target in the exterior housing.

Besides, since the flow velocity and the flow rate of the air passing the plurality of openings are increased, it is possible to suppress a temperature rise of the partition member that forms the plurality of openings.

In the aspect, it is preferable that the partition member includes first partitioning sections and second partitioning sections that form the plurality of openings along a first direction and a second direction orthogonal to each other on a surface orthogonal to a circulating direction of the air circulating from the cooling device toward the exhaust port, one partitioning sections of the first partitioning sections and the second partitioning sections are disposed to incline with respect to the circulating direction, and the projecting sections are located within a disposition range of the one partitioning sections when viewed along the circulating direction.

According to the aspect with this configuration, the one partitioning sections of the first partitioning sections and the second partitioning sections incline with respect to the circulating direction of the air circulating to the exhaust port. Consequently, by adjusting an inclining direction of the one partitioning sections, it is possible to adjust a discharge direction of the air discharged via the partition member to a desired direction.

The projecting sections are located within the disposition range of the one partitioning sections when the partition member is viewed along the circulating direction. Therefore, it is possible to suppress an opening area of the opening from decreasing because the projecting sections are disposed. That is, an opening area of the opening in which the projecting sections are disposed and an opening area of the opening in which the projecting sections are not disposed can be set to the same area. Therefore, since an increase in discharge resistance due to the provision of the projecting sections can be suppressed, it is possible to smoothly discharge the air via the partition member.

In the aspect, it is preferable that the projecting sections are disposed in crossing parts of the first partitioning sections and the second partitioning sections.

According to the aspect with this configuration, since the projecting sections are provided in the crossing parts of the first partitioning sections and the second partitioning sections, it is possible to increase the strength of the first partitioning sections and the second partitioning sections in the crossing parts. Therefore, it is possible to improve the mechanical strength of the partition member.

If the projecting sections are formed integrally with the partition member, it is possible to surely dispose the projecting sections in the crossing part. Further, it is possible to configure the partition member without adding a new member. Consequently, it is possible to surely attain the effect explained above.

In the aspect, it is preferable that, in the opening, the projecting sections are respectively disposed on one end side and the other end side of a direction orthogonal to the circulating direction of the air circulating from the cooling device toward the exhaust port, and the projecting section disposed on the one end side and the projecting section disposed on the other end side have different shapes.

According to the aspect with this configuration, the shapes of the projecting sections disposed on the one end side and the other end side of the opening are different from each other. Consequently, when the air passes the opening, since flows of the air circulating through the one end side and the other end side of the opening are different, the flows collide with each other to make it easy to generate the small swirl (the turbulent flow). Therefore, it is possible to surely reduce exhaust noise of the projector. Further, it is possible to surely improve exhaust efficiency.

In the aspect, it is preferable that the projecting sections include inclining surfaces inclining with respect to the circulating direction of the air circulating from the cooling device to the exhaust port.

According to the aspect with this configuration, when the air circulates through the opening, by generating a flow of the air not along the projecting sections and a flow of the air along the inclining surfaces of the projecting sections, it is possible to make it easy to generate the small swirl (the turbulent flow). Therefore, it is possible to surely reduce exhaust noise of the projector. Further, it is possible to surely improve exhaust efficiency.

In the aspect, it is preferable that the projecting sections are formed in a substantially pyramid shape, and the inclining surfaces incline such that a sectional area of the projecting sections on a downstream side in the circulating direction is larger than a sectional area of the projecting sections on an upstream side in the circulating direction.

According to the aspect with this configuration, since the projecting sections are formed in the substantially pyramid shape, it is possible to make it easy to form the inclining surfaces. Since the air circulates on the inclining surfaces, it is possible to suppress spread of the air. Consequently, it is possible to make it easy to generate a turbulent flow of the air circulating along the inclining surfaces and the air circulating not along the inclining surfaces. Therefore, it is possible to urge generation of the small swirl (the turbulent flow). It is possible to attain a reduction in exhaust noise of the projector and improvement of exhaust efficiency.

In the aspect, it is preferable that the opening in which the projecting sections are disposed among the plurality of openings is formed in a substantially rectangular shape, the projecting sections including the inclining surfaces are respectively disposed at two corners on one end side in the opening, and the inclining surfaces of the projecting sections disposed at the two corners are opposed to each other.

According to the aspect with this configuration, the inclining surfaces of the projecting sections disposed at the two corners on the one end side of the opening are opposed to each other. Consequently, a gap between the projecting sections is narrowed toward the circulating direction of the air. It is possible to make it easy to cause the air circulating along the inclining surfaces of the projecting sections to collide. Since the air discharged along the inclining surfaces easily swirls, a turbulent flow is easily generated. Therefore, it is possible to further urge the generation of the small swirl (the turbulent flow). It is possible to surely attain a reduction in exhaust noise of the projector and improvement of exhaust efficiency.

BRIEF DESCRIPTION OF DRAWINGS

FIG. 1 is a perspective view showing the exterior of a projector according to an embodiment of the invention.

FIG. 2 is a schematic diagram showing the configuration of an apparatus main body in the embodiment.

FIG. 3 is a perspective view of a partition member in the embodiment viewed from the left on the front side.

FIG. 4 is a perspective view of the partition member in the embodiment viewed from the right on the front side.

FIG. 5 is a perspective view of the partition member in the embodiment viewed from the left on the back side.

FIG. 6 is a perspective view of the partition member in the embodiment viewed from the right on the back side.

FIG. 7 is a sectional view showing the partition member in the embodiment.

FIG. 8 is a diagram showing the cross section of the partition member in the embodiment.

FIG. 9 is a diagram of the partition member in the embodiment viewed from the front side.

FIG. 10 is a diagram of the partition member in the embodiment viewed from the back side.

FIG. 11 is a sectional view showing the partition member in the embodiment.

FIG. 12 is a diagram showing a flow velocity distribution of exhaust air in the case in which a comparison target partition member in the embodiment is adopted.

FIG. 13 is a diagram showing a flow velocity distribution of exhaust air in the case in which the comparison target partition member in the embodiment is adopted.

FIG. 14 is a diagram showing a flow velocity distribution of exhaust air in the case in which the partition member in the embodiment is adopted.

FIG. 15 is a diagram showing a flow velocity distribution of exhaust air in the case in which the partition member in the embodiment is adopted.

FIG. 16 is a graph showing a relation between rotating speed of fans and exhaust noise in the embodiment.

DESCRIPTION OF EMBODIMENTS

An embodiment of the invention is explained below.

Exterior Configuration of a Projector

FIG. 1 is a perspective view of a projector 1 according to this embodiment viewed from above on the front side.

The projector 1 according to this embodiment is an image display apparatus that modulates light emitted from a light source device disposed on the inside to form an image corresponding to image information and enlarges and projects the image on a projection surface such as a screen. The projector 1 includes, as shown in FIG. 1, an exterior housing 2 configuring an exterior and an apparatus main body 3 disposed in the exterior housing 2.

Configuration of the Exterior Housing

As shown in FIG. 1, the exterior housing 2 has a substantially rectangular parallelepiped shape as a whole. In this embodiment, the exterior housing 2 is formed of synthetic resin. The exterior housing 2 includes an upper case 21 and a lower case 22. The exterior housing 2 is configured by combining the upper case 21 and the lower case 22.

The upper case 21 configures respective parts of a top surface section 2A, a front surface section 2C, a rear surface section 2D, a left side surface section 2E, and a right side surface section 2F in the exterior housing 2. The lower case 22 configures respective parts of a bottom surface section 2B, the front surface section 2C, the rear surface section 2D, the left side surface section 2E, and the right side surface section 2F in the exterior housing 2.

Among the surface sections 2A to 2F, on the right side surface section 2F, an intake port 2F1 for introducing the air on the outside of the exterior housing 2 into the inside is formed.

In the front surface section 2C, an opening 2C1 for exposing a part of a projection optical device 46 explained below and causing an image projected from the projection optical device 46 to pass is formed.

In a position on the left side surface section 2E in the front surface section 2C, an exhaust port 2C2 from which the air, which has circulated in the exterior housing 2 and cooled a cooling target, is discharged is formed. In the exhaust port 2C2, a partition member 6 is fit. The partition member 6 is explained in detail below.

Configuration of the Apparatus Main Body

FIG. 2 is a schematic diagram showing the configuration of the apparatus main body 3.

The apparatus main body 3 is equivalent to the internal configuration of the projector 1 and disposed in the exterior housing 2. The apparatus main body 3 includes, as shown in FIG. 2, an image forming device 4 and a cooling device 5. Note that, although not shown in the figure, besides, the apparatus main body 3 includes a control device that controls the operation of the entire projector 1 and a power supply device that supplies electric power to electronic components configuring the projector 1.

Configuration of the Image Forming Device

The image forming device 4 forms and projects an image corresponding to image information under the control by the control device. The image forming device 4 includes, as shown in FIG. 2, a light source device 41, an illumination optical device 42, a color separating device 43, a relay device 44, an electrooptical device 45, a projection optical device 46, and an optical component housing 47 that houses and supports these devices.

The light source device 41 emits a light beam to the illumination optical device 42. The light source device 41 includes a light source lamp 411, a reflector 412, a collimating lens 413, and a housing 414 that houses these components. Although not shown in the figure, the housing 414 includes an introducing port for introducing cooling air delivered from a fan 53 configuring the cooling device 5 explained below into the inside and a discharge portion for discharging the air that has been introduced into the housing 414 and has cooled the light source lamp 411.

The illumination optical device 42 equalizes illuminance in a surface orthogonal to a center axis of the light beam made incident from the light source device 41. The illumination optical device 42 includes, in the order of incidence of light from the light source device 41, a first lens array 421, a dimming device 422, a second lens array 423, a polarization conversion element 424, and a superimposing lens 425.

The color separating device 43 separates the light beam made incident from the illumination optical device 42 into three color lights of red (R), green (G), and blue (B). The color separating device 43 includes dichroic mirrors 431 and 432 and a reflection mirror 433.

The relay device 44 is provided on an optical path of the red light that is long compared with optical paths of the other color lights. The relay device 44 includes an incidence side lens 441, a relay lens 443, and reflection minors 442 and 444.

The electrooptical device 45 modulates the separated color lights respectively according to image information and thereafter combines the color lights. The electrooptical device 45 includes field lenses 451, incidence side polarizing plates 452, liquid crystal panels 453 (liquid crystal panels for red, green, and blue are respectively represented as 453R, 453G, and 453B) functioning as light modulating devices, visual-field-angle compensating plates 454, and emission side polarizing plates 455 respectively provided for the color lights and a color combining device 456 that combines the modulated color lights and forms a projection image. Among these components, in this embodiment, the color combining device 456 is configured by a cross dichroic prism.

The projection optical device 46 enlarges and projects the formed projection image on the projection surface. The projection optical device 46 is configured as a group lens including a plurality of lenses (not shown in the figure) and a lens barrel 461 that houses the plurality of lenses on the inside.

Although not shown in the figure in detail, the optical component housing 47 includes a component housing member that houses various optical components, a lid-like member that closes an opening for component housing formed in the component housing member, and a supporting member that supports the projection optical device 46. An illumination optical axis Ax is set in the optical component housing 47. The devices 41 to 46 are disposed in predetermined positions with respect to the illumination optical axis Ax. Therefore, when the light source device 41 is disposed in the optical component housing 47, a center axis of light emitted from the light source device 41 coincides with the illumination optical axis Ax.

Configuration of the Cooling Device

The cooling device 5 is configured by four fans 51 to 54. The cooling device 5 blows the air introduced from the outside of the exterior housing 2 to the image forming device 4, the power supply device, and the control device, which are respectively cooling targets, and cools the devices. Among the fans 51 to 54, a pair of fans 51 and 52 disposed to sandwich the projection optical device 46 is configured by sirocco fans. The pair of fans 51 and 52 introduces cooling air on the outside from the intake port 2F1 (see FIG. 1) formed in the right side surface section 2F of the exterior housing 2 and blows the cooling air to the electrooptical device 45.

Among the fans 53 and 54 disposed in the vicinity of the light source device 41, the fan 53 located on the rear surface section 2D side of the projector 1 is configured by a sirocco fan. The fan 53 sucks the air in the exterior housing 2 and blows the air to the housing 414 (specifically, the introducing port) of the light source device 41. The light source lamp 411 and the reflector 412, which are cooling targets, are mainly cooled by the air delivered by the fan 53.

The fan 54 is configured by an axial fan. The fan 54 sucks the air, which has cooled the light source device 41, from the discharge port of the housing 414 and discharges the air to the front surface section 2C (specifically, the exhaust port 2C2 formed in the front surface section 2C). The air is discharged to the outside of the exterior housing 2 via the exhaust port 2C2.

Note that the fan 53 may be an axial fan and the fan 54 may be a sirocco fan. The exhaust port, from which the air is discharged, may be formed in any surface of the exterior housing 2. Further, the fan 54 and the partition member 6 provided in the exhaust port 2C2 may be connected by a duct.

Configuration of the Partition Member

The partition member 6 is a louver that is attached to the exhaust port 2C2 and partitions the exhaust port 2C2 to form a plurality of openings 6S as shown in FIG. 1. The partition member 6 has a function of efficiently discharging the air, which is discharged from the fan 54, to the outside of the exterior housing 2 and reducing exhaust noise.

FIGS. 3 to 6 are perspective views showing the partition member 6. Specifically, FIGS. 3 and 4 are perspective views of the partition member 6 viewed from the left on the front side and the right on the front side. FIGS. 5 and 6 are perspective views of the partition member 6 viewed from the left on the back side and the right on the back side.

The partition member 6 includes, as shown in FIGS. 3 to 6, a substantially rectangular outer edge section 61 fit in the exhaust port 2C2 and a plurality of partitioning sections 62 disposed in a lattice shape on the inner side of the outer edge section 61. A plurality of openings 6S, through which the air discharged from the fan 54 (hereinafter referred to as exhaust air) passes, are respectively formed by the plurality of partitioning sections 62.

Note that, in the following explanation, a delivering direction of the air by the fan 54 is represented as a Z direction. Directions orthogonal to each other in a surface orthogonal to the Z direction are represented as an X direction and a Y direction. Among these directions, the Y direction is a direction from the bottom surface section 2B toward the top surface section 2A. The X direction is a direction from the left side surface section 2E toward the right side surface section 2F. Note that the X direction and the Y direction respectively correspond to the first direction and the second direction according to the invention. The Z direction corresponds to the circulating direction of the air according to the invention.

The outer edge section 61 is formed in a substantially rectangular shape corresponding to the shape of the exhaust port 2C2. The outer edge section 61 includes, as shown in FIGS. 3 and 4, a covering section 611 that covers the end edge of the exhaust port 2C2 when the partition member 6 is attached to the exhaust port 2C2 (the front surface section 2C). The outer edge section 61 includes, as shown in FIGS. 5 and 6, a contact section 612 that extends to the opposite side of the Z direction and is set in contact with the inner edge of the exhaust port 2C2.

The partitioning section 62 includes three first partitioning sections 63 extending along the Y direction and three second partitioning sections 64 extending along the X direction. Sixteen openings 6S in total in four rows and four columns are formed on the inner side of the partition member 6 by the first partitioning sections 63 and the second partitioning sections 64 and the outer edge section 61. The openings 6S are formed in a substantially rectangular shape having a longitudinal direction in the X direction and having a latitudinal direction in the Y direction.

Note that, as shown in FIGS. 5 and 6, on surfaces on the Y-direction side in the second partitioning sections 64 extending along the X direction and surfaces on the opposite side of the Y direction, recesses 641 are formed in positions on the opposite side of the Z direction (i.e., positions on an air entering side of the exhaust air) in regions forming end edges of the openings 6S. The recesses 641 have a function of rectifying the air that passes through the openings 6S.

Configuration of Projecting Sections

In crossing parts of the first partitioning sections 63 and the second partitioning sections 64, that is, at corners of the substantially rectangular openings 6S, projecting sections 7 (71 to 74) projecting toward the inner side of the openings 6S are provided.

Specifically, the projecting sections 71 are provided in crossing parts of the first partitioning sections 63 located on the X-direction side and the second partitioning sections 64 located on the Y-direction side in the openings 6S.

The projecting sections 72 are provided in crossing parts of the first partitioning sections 63 located on the X-direction side and the second partitioning sections 64 located on the opposite side of the Y direction in the openings 6S.

The projecting sections 73 are provided in crossing parts of the first partitioning sections 63 located on the opposite side of the X direction and the second partitioning sections 64 located on the Y-direction side in the openings 6S.

The projecting sections 74 are provided in crossing parts of the first partitioning sections 63 located on the opposite side of the X direction and the second partitioning sections 64 located on the opposite side of the Y direction in the openings 6S.

The projecting sections 7 (71 to 74) are formed integrally with the partition member 6 (the first partitioning sections 63 and the second partitioning sections 64).

The projecting sections 71 and 72 are not provided in openings 6S1 and 6S2 in one row located most on the X-direction side among four rows of the openings 6S. The projecting section 73 is not provided and only the projecting section 74 is provided in the opening 6S1 located most on the Y-direction side among the openings 6S1 and 6S2.

The projecting sections 73 and 74 are not provided in openings 6S3 and 6S4 of one row located most on the opposite side of the X direction among the four rows of the openings 6S. The projecting section 71 is not provided and only the projecting section 72 is provided in the opening 6S3 located most on the Y-direction side among the openings 6S3 and 6S4.

Further, the openings 6S in two rows located in the center in the X direction among the four rows of the openings 6S are divided into openings 6S5 and 6S6. The projecting sections 71 and 73 are not provided and the projecting sections 72 and 74 are provided in the opening 6S5 located most on the Y-direction side. On the other hand, the projecting sections 71 to 74 are provided in six openings 6S6 located on the opposite side of the Y direction with respect to the opening 6S5.

As shown in FIGS. 3 and 5, the projecting sections 71 and 72 are formed in substantially right-angled triangular prism shapes.

Specifically, the outer surface of the projecting section 71 is configured by a surface perpendicularly standing to the opposite side of the Y direction from the second portioning section 64 on the Y-direction side that forms the end edge of the opening 6S and a surface standing while inclining approximately 45° to the opposite side of the Y direction with respect to the first partitioning sections 63 on the X-direction side.

The outer surface of the projecting section 72 is configured by a surface standing perpendicularly to the Y-direction side from the second partitioning section 64 on the opposite side of the Y direction that forms the end edge of the opening 6S and a surface standing while inclining approximately 45° in the Y-direction side with respect to the first partitioning sections 63 on the X-direction side.

FIG. 7 is a diagram of a cross section along a YZ plane of the partition member 6 viewed from the opposite side of the X direction.

Therefore, between the projecting sections 71 and 72, a gap having an interval between the projecting sections 71 and 72 increasing toward the X direction, in other words, a gap having the interval narrowing toward the opposite side of the X direction is formed. Note that, as explained above, the projecting sections 71 and 72 are respectively formed in substantially right-angled triangular prism shapes. Therefore, the interval between the projecting sections 71 and 72 does not change in the Z direction as shown in FIG. 7.

FIG. 8 is a diagram showing a cross section along the YZ plane of the partition member 6.

The projecting sections 73 and 74 are formed in substantially triangular pyramid shapes as shown in FIGS. 4, 6, and 8.

Specifically, the projecting sections 73 include, as shown in FIG. 8, inclining surfaces 731 inclining approximately 45° with respect to the second partitioning sections 64 on the Y-direction side that form the end edges of the openings 6S and the first partitioning sections 63 on the opposite side of the X direction and inclining with respect to the Z direction. That is, the projecting sections 73 include the inclining surfaces 731 inclining in the Z direction such that sectional area of the projecting sections 73 increases toward the Z-direction side. That is, the inclining surfaces 731 incline such that sectional area of the projecting sections 73 on the downstream side in the Z direction (a distal end side in the Z direction and the downstream side in the circulating direction of the air according to the invention) is larger than sectional area of the projecting sections 73 on the upstream side in the Z direction (a proximal end side in the Z direction and the upstream side in the circulating direction).

Similarly, the projecting sections 74 include, as shown in FIG. 7, inclining surfaces 741 inclining approximately 45° with respect to the second partitioning sections 64 on the opposite side of the Y-direction side that form the end edges of the openings 6S and the first partitioning sections 63 on the opposite side of the X direction and inclining with respect to the Z direction. That is, the projecting sections 74 include the inclining surfaces 741 inclining in the Z direction such that sectional area of the projecting sections 74 increases toward the Z-direction side. That is, the inclining surfaces 741 incline such that sectional area of the projecting sections 74 on the downstream side in the Z direction is larger than sectional area of the projecting sections 74 on the upstream side in the Z direction.

Therefore, between the projecting sections 73 and 74, a gap having an interval between the projecting sections 73 and 74 narrowing toward the Z direction and narrowing toward the opposite side of the X direction is formed.

Inclination of the First Partitioning Sections

FIGS. 9 and 10 are diagrams of the partition member 6 viewed from the front side (the Z-direction side) and the back side (the opposite side of the Z direction). FIG. 11 is a diagram of a cross section along an XZ plane of the partition member 6 viewed from the opposite side of the Y direction.

The first partitioning sections 63 along the Y direction incline with respect to the Z direction as shown in FIGS. 9 to 11. Specifically, the first partitioning sections 63 incline approximately 28° to the opposite side of the X direction with respect to the Z direction. Therefore, a circulating direction of exhaust air delivered from the fan 54 and circulating along the Z direction inclines to the opposite side of the X direction, that is, to the left side surface section 2E side when the exhaust air passes through the openings 6S of the partition member 6. Consequently, a situation is suppressed in which exhaust air having relatively high temperature circulates to the X-direction side with respect to the exhaust port 2C2 and an image projected from the projection optical device 46 exposed in the opening 2C1 shakes.

As shown in FIGS. 9 to 11, the projecting sections 7 (71 to 74) located in the crossing parts of the first partitioning sections 63 and the second partitioning sections 64 are located in a disposition range of the first partitioning sections 63 when the partition member 6 is viewed along the Z direction (or the opposite direction of the Z direction).

Specifically, the projecting sections 71 and 73 are disposed between an imaginary surface P1 on the opposite side of the Z direction in the first partitioning sections 63 and parallel to the YZ plane that passes the end portion on the X-direction side and an imaginary surface P2 parallel to the YZ plane passing on the Z-direction side in the first partitioning sections 63 and parallel to the YZ plane that passes the end portion on the opposite side of the X direction. That is, the projecting sections 71 to 74 are respectively located on a surface on the X-direction side and a surface on the opposite side of the X direction and are located within a disposition range (within a dimension in the X direction) of the first partitioning sections 63 when the partition member 6 is viewed along the Z direction.

Note that the projecting sections 72 and 74 are not shown in FIG. 11. However, as shown in FIGS. 9 and 10, the same applies to the projecting sections 72 and 74.

The projecting sections 71 and 72 disposed in this way overlap the first partitioning sections 63 when the partition member 6 is viewed along the Z direction as shown in FIG. 10. The projecting sections 73 and 74 overlap the first partitioning sections 63 when the partition member 6 is viewed along the opposite direction of the Z direction as shown in FIG. 9.

Therefore, when the partition member 6 is viewed from the opposite side of the Z direction, that is, the disposition position of the fan 54, an opening area of the openings 6S does not change when the projecting sections 71 to 74 are provided and when the projecting sections 71 to 74 are not provided. Consequently, with the projecting sections 71 to 74, the opening area of the openings 6S is reduced and exhaust is suppressed from being hindered.

Flow Velocity of Exhaust Air

FIG. 12 is a diagram showing, when a partition member 6A compared with the partition member 6 is adopted, a flow velocity distribution on the YZ plane of exhaust air delivered from the fan 54 and passing the partition member 6A. Note that, in FIGS. 12 to 15, a region where flow velocity of the exhaust air is the highest is indicated by a region FR1. In the following explanation, the flow velocity decreases in the order of a region FR2, a region FR3, and a region FR4.

The flow velocity distribution of the exhaust air in the case in which the partition member 6A compared with the partition member 6 is adopted is explained. Note that the partition member 6A has a configuration same as the configuration of the partition member 6. However, the projecting sections 7 are not provided in the partition member 6A.

When the fan 54 is driven in the projector 1 in which the partition member 6A is attached to the exhaust port 2C2, the region FR1 where the flow velocity is the highest in a circulation range of the exhaust air passing the partition member 6A is located in a relatively short range in the Z direction from the partition member 6A as shown in FIG. 12. The region FR2, the region FR3, and the region FR4 where the flow velocity decreases in order are located on the outer side of the region FR1.

FIG. 13 is a diagram showing a flow velocity distribution on an XY plane of exhaust air passing the partition member 6A.

As shown in FIG. 13, the region FR1 is a relatively small region on the XY plane. The region FR2 where the flow velocity is lower than the flow velocity in the region FR1 is also a relatively small region. On the other hand, the region FR3 where the flow velocity is lower than the flow velocity in the region FR2 and the region FR4 where the flow velocity is lower than the flow velocity in the region FR3 are relatively large regions.

Further, although not shown in the figure, in the exhaust air passing the partition member 6A, disturbance is small in the circulating direction of the exhaust air.

FIG. 14 is a diagram showing, when the partition member 6 is adopted, a flow velocity distribution on the YZ plane of exhaust air delivered from the fan 54 and passing the partition member 6.

On the other hand, in the projector 1 in which the partition member 6 is attached to the exhaust port 2C2, when the fan 54 is driven at rotating speed same as the rotating speed at the time when the partition member 6A is adopted, a circulation range on the YZ plane of the exhaust air passing the partition member 6 is a range substantially the same as the circulation range (see FIG. 12) on the YZ plane of the exhaust air passing the partition member 6A. The region FR1 where the flow velocity is the highest (the flow velocity same as the flow velocity in the region FR1 explained above) in the circulation range of the exhaust air passing the partition member 6 is a region long (wide) in the Z direction and the Y direction compared with when the partition member 6A is adopted. In the circulation range, the regions FR2, FR3, and FR4 are regions relatively narrow in the Y direction.

This indicates that the flow velocity of the exhaust air passing the partition member 6 is maintained in a state in which the flow velocity is high compared with the flow velocity of the exhaust air passing the partition member 6A and indicates that discharge efficiency of the exhaust air obtained when the partition member 6 is adopted is higher than discharge efficiency of the exhaust air obtained when the partition member 6A is adopted.

FIG. 15 is a diagram showing a flow velocity distribution on the XY plane of exhaust air passing the partition member 6.

In the projector 1 in which the partition member 6 is adopted, when the fan 54 is driven at rotating speed same as the rotating speed for driving the fan 54 when the partition member 6A is adopted, as shown in FIG. 15, a circulation range on the XY plane of the exhaust air passing the partition member 6 is a range substantially the same as the circulation range (see FIG. 13) on the XY plane of the exhaust air passing the partition member 6A.

However, the region FR1 on the XY plane of the exhaust air passing the partition member 6 is a large region compared with when the partition member 6A is adopted. The number of the regions FR1 also increases. That is, the area of the region FR1 is large when the partition member 6 is adopted compared with when the partition member 6A is adopted. Similarly, the area and the number of the regions FR2 also increase compared with when the partition member 6A is adopted. On the other hand, the areas of the regions FR3 and FR4 are respectively small compared with when the partition member 6A is adopted.

Further, although not shown in the figure, in the exhaust air passing the partition member 6, disturbance in the circulating direction of the exhaust air is large and a plurality of the small swirls are generated. The swirls are seen in a position between a high flow velocity region and a low flow velocity region, for example, a position sandwiched by the region FR4 and the region FR3.

In this way, the areas of the regions FR1 and FR2 where the flow velocity of the exhaust air is high are large compared with when the partition member 6A is adopted. This indicates that a discharge flow rate of the exhaust air increases and discharge efficiency of the exhaust air is improved.

Exhaust Noise of the Projector

FIG. 16 is a graph showing exhaust noise of the projector 1 in which the partition member 6 and the partition member 6A are adopted. In other words, FIG. 16 is a graph showing exhaust noise of the projector 1 during driving of the fan 54 (an exhaust fan of the cooling device 5) at respective rotating speeds. That is, FIG. 16 is a graph showing a relation between the rotating speed of the fan 54 and the exhaust noise.

As shown in FIG. 16, the exhaust noise during the driving of the fan 54 is reduced more when the partition member 6 is attached to the exhaust port 2C2 of the projector 1 (indicated by a dotted line) than when the partition member 6A is attached (indicated by a solid line).

For example, during high speed rotation (during rotation at 3400 rpm) of the fan 54 adopted when the light source lamp 411 is lit at high luminance, the exhaust noise was lower by approximately 1 decibel (dB) when the partition member 6 is adopted. Further, during low speed rotation (during rotation at 2400 rpm) of the fan 54 adopted when the light source lamp 411 is lit at low luminance, the exhaust noise was lower by approximately 3 decibels when the partition member 6 is adopted. The difference of 3 decibels indicates that the exhaust noise that occurs when the partition member 6A is adopted is 1.4 times as high as the exhaust noise that occurs when the partition member 6 is adopted.

In this way, by adopting the partition member 6 provided with the projecting sections 7 (71 to 74), it is possible to reduce the exhaust noise compared with when the partition member 6A not provided with the projecting sections 7 is adopted. This is because the projecting sections 7 generate a small swirl (a turbulent flow) of the air in a process in which the exhaust air passes through the openings 6S. Consequently, occurrence of noise due to the exhaust air is suppressed and the exhaust noise of the projector 1 is reduced. Further, the exhaust air is discharged from the partition member 6 while high flow velocity is maintained. Therefore, discharge efficiency of the exhaust air and cooling efficiency of the cooling targets are improved.

Effects of the Embodiment

With the projector 1 according to this embodiment explained above, there are effects explained below.

When the exhaust air delivered from the fan 54 of the cooling device 5 circulates through the openings 6S formed by partitioning the exhaust port 2C2 with the partition member 6, a plurality of the small swirls of the air can be generated by the projecting sections 7 projecting into the openings 6S. Consequently, as shown in FIG. 16, it is possible to reduce air sound compared with when the air circulates in the partition member 6A not including the projecting sections 7 and a large swirl is generated. Therefore, it is possible to reduce the exhaust noise of the projector 1.

By generating a small swirl of the air with the projecting sections 7, resistance of the air passing through the openings 6S is reduced. Consequently, it is possible to suppress the flow velocity of the exhaust air from being reduced. It is possible to increase a flow rate of the exhaust air to the outside of the exterior housing 2. Therefore, it is possible to improve discharge efficiency of the air, which has cooled the cooling targets such as the light source device 41 (the light source lamp 411). Further, it is possible to effectively cool the cooling targets.

Besides, since the flow velocity and the flow rate of the air passing through the openings 6S are increased, it is possible to suppress a temperature rise of the partition member 6 in which the openings 6S are formed.

Of the first partitioning sections 63 and the second partitioning sections 64, the first partitioning sections 63 along the Y direction are inclined to tilt to the opposite side of the X direction toward the Z direction with respect to the delivering direction of the air by the fan 54, that is, the Z direction, which is the circulating direction of the air circulating to the exhaust port 2C2. Consequently, it is possible to tilt the discharge direction of the air discharged via the partition member 6 to the opposite side of the X direction. Therefore, it is possible to suppress the exhaust air having relatively high temperature discharged from the partition member 6 from circulating to an optical path of an image projected from the projection optical device 46. It is possible to suppress shaking from occurring in a projected image.

The projecting sections 7 (71 to 74) are located within a disposition range (within a dimension in the X direction) of the first partitioning sections 63 inclining with respect to the Z direction when the partition member 6 is viewed along the Z direction. Consequently, when the partition member 6 is viewed along the Z direction, it is possible to suppress the opening area of the openings 6S from being reduced because the projecting sections 7 (71 to 74) are provided. That is, the opening area of the openings 6S in which the projecting sections 7 are disposed and the opening area of the openings in which the projecting sections 7 are not disposed can be set to the same area. Therefore, it is possible to suppress an increase in discharge resistance due to the provision of the projecting sections 71 to 74. It is possible to smoothly discharge the air via the partition member 6.

The projecting sections 7 are disposed in the crossing parts of the first partitioning sections 63 and the second partitioning sections 64. Consequently, it is possible to increase the strength of the first partitioning sections 63 and the second partitioning sections 64 in the crossing parts. Therefore, it is possible to increase the mechanical strength of the partition member 6.

The projecting sections 7 are formed integrally with the first partitioning sections 63 and the second partitioning sections 64, that is, the partition member 6. Consequently, it is possible to surely dispose the projecting sections 7 in the crossing parts. Further, it is possible to configure the partition member without adding a new member.

Therefore, it is possible to surely attain the effects explained above.

The projecting sections 71 and 72 disposed on the X-direction side in the openings 6S (specifically, the openings 6S5 and 6S6) and the projecting sections 73 and 74 disposed on the opposite side of the X direction have the shapes different from each other. Consequently, when the exhaust air passes through the openings 6S, it is possible to make it easy to generate the small swirl (the turbulent flow). Therefore, it is possible to surely reduce the exhaust noise of the projector 1. Further, it is possible to surely improve exhaust efficiency.

The projecting sections 73 and 74 located on the opposite side of the X direction in the openings 6S include the inclining surfaces 731 and 741 inclining with respect to the Z direction. Consequently, when the exhaust air passes through the openings 6S (specifically, the openings 6S1, 6S2, 6S5, and 6S6), by generating a flow of the air not along the projecting sections 73 and 74 and a flow of the air along the inclining surfaces 731 and 741 of the projecting sections 73 and 74, it is possible to make it easy to generate a plurality of the small swirls. Therefore, it is possible to surely reduce the exhaust noise of the projector 1 and surely improve the exhaust efficiency.

The projecting sections 73 and 74 are formed in the substantially triangular pyramid shapes having sectional areas increasing toward the Z direction. Therefore, it is possible to make it easy to form the inclining surfaces 731 and 741. Since the exhaust air circulates on the inclining surfaces 731 and 741, it is possible to suppress the exhaust air passed through the openings 6S from spreading in the X direction and the Y direction. Consequently, it is possible to cause the air circulating along the inclining surfaces 731 and 741 and the air circulating not along the inclining surfaces 731 and 741 to collide with each other. Therefore, it is possible to urge generation of a plurality of the small swirls. It is possible to attain a reduction in the exhaust noise of the projector 1 and improvement of the exhaust efficiency.

The inclining surfaces 731 and 741 of the projecting sections 73 and 74 disposed at the two corners on the opposite side of the X direction in the opening 6S (specifically, the opening 6S2, 6S6) are opposed to each other. Consequently, since the gap between the projecting sections 73 and 74 is narrowed toward the Z direction, it is possible to make it easy to cause the air circulating along the inclining surfaces 731 and 741 of the projecting sections 73 and 74 to collide. Since the air discharged along the inclining surfaces 731 and 741 easily swirls, a turbulent flow is easily generated. Therefore, it is possible to further urge the generation of a plurality of the small swirls. It is possible to surely attain a reduction in the exhaust noise of the projector 1 and improvement of the exhaust efficiency.

Modifications of the Embodiment

The invention is not limited to the embodiment. Modifications, improvements, and the like in a range in which the object of the invention can be attained are included in the invention.

In the embodiment, the openings 6S of the partition member 6 are formed in the substantially rectangular shape having the longitudinal direction in the X direction. However, the invention is not limited to this. That is, the shape of the openings may be other shapes, for example, a circular shape (including a perfect circle and an ellipse) and other polygonal shapes. An array form of the openings is not limited to a matrix shape and may be an alternate array such as a honeycomb structure. The longitudinal directions of the openings formed in a polygonal shape may be the Y direction.

In the embodiment, the projecting sections 7 are disposed at the corners in the substantially rectangular openings 6S. Specifically, the projecting sections 71 to 74 are disposed in the crossing parts of the first partitioning sections 63 and the second partitioning sections 64. However, the invention is not limited to this. That is, the positions of the projecting sections in the openings may be any positions. The number of projecting sections can be changed as appropriate. For example, any one of the projecting sections 71 to 74 may be provided. Two projecting sections selected out of the projecting sections 71 to 74 may be provided.

The projecting sections do not have to be in contact with the respective first and second partitioning sections 63 and 64. For example, the projecting sections may be in contact with only the first partitioning sections 63 or only the second partitioning sections 64.

In the embodiment, the projecting sections 71 and 72 located on the X-direction side in the openings 6S and the projecting sections 73 and 74 located on the opposite side of the X direction have the different shapes each other. However, the invention is not limited to this. That is, if it is possible to attain at least any one of a reduction in air sound (exhaust noise) caused by the air passing the partition member and improvement of exhaust efficiency, the shapes of the plurality of projecting sections may be the same. Even when only one projecting section is provided, the shape of the projecting section can be changed as appropriate.

In the embodiment, the projecting sections 73 and 74 are respectively formed in the substantially triangular pyramid shapes having the sectional areas increasing toward the Z direction. The projecting sections 73 and 74 include the inclining surfaces 731 and 741 inclining with respect to the Z direction. However, the invention is not limited to this. That is, the projecting sections may have a square pyramid shape or may have other polygonal pyramid shapes. Unlike the projecting sections 71 and 72, the projecting sections 73 and 74 do not have to include inclining surfaces with respect to the Z direction. Even when the projecting sections 73 and 74 include the inclining surface, the projecting sections 73 and 74 may incline in other directions without being limited to an inclining direction same as the inclining direction of the inclining surfaces 731 and 741.

In the embodiment, the projecting sections 71 and 72 are formed in the substantially right-angled triangular prism shapes. The gap between the projecting sections 71 and 72 is formed to increase toward the X direction. However, the invention is not limited to this. For example, if the air can circulate along the Z direction between the projecting sections 71 and 72, the shape of the projecting sections 71 and 72 may be other shapes. The interval between the projecting sections 71 and 72 may be fixed in the X direction as in the case in which the projecting sections 71 and 72 are formed in the prism shapes or may decrease.

In the embodiment, the first partitioning sections 63 and the second partitioning sections 64 are fixed to the outer edge section 61. However, the invention is not limited to this. That is, at least one partitioning sections of the first partitioning sections 63 and the second partitioning sections 64 may be provided at the outer edge section 61 to be turnable around a turning axis extending along the longitudinal direction of the at least one partitioning sections. In this case, if the projecting sections are provided in the at least one partitioning sections, the projecting sections can be turned together with the at least one partitioning sections.

In the embodiment, the partition member 6 is attached to the exhaust port 2C2.

However, the invention is not limited to this. That is, the partition member 6 does not have to be configured as a member separate from the exterior housing 2 and may be formed integrally with the exterior housing 2. In this case, for example, the first partitioning sections 63 and the second partitioning sections 64 in which at least one projecting section of the projecting sections 71 to 74 is formed may be disposed in the exhaust port 2C2.

In this embodiment, the first partitioning sections 63 incline approximately 28° to the opposite side of the X direction with respect to the Z direction, which is the circulating direction of the air circulating from the fan 54 toward the exhaust port 2C2. However, the invention is not limited to this. That is, the first partitioning sections 63 do not have to incline with respect to the YZ plane. Even when the first partitioning sections 63 incline, the direction and the angle of the inclination can be changed as appropriate.

In the embodiment, the exterior housing 2 is configured by combining the upper case 21 and the lower case 22. However, the invention is not limited to this. For example, the exterior housing may be configured by attaching a front case, which configures the front surface section, and a rear case, which configures the rear surface section, to the upper case and the lower case.

In the embodiment, the projector 1 includes the three liquid crystal panels 453 (453R, 453G, and 453B). However, the invention is not limited to this. That is, the invention is also applicable to a projector including two or less or four or more liquid crystal panels.

In the embodiment, the configuration having the substantially L-shape in plan view is explained as the image forming apparatus 4. However, the invention is not limited to this. For example, a configuration having a substantially U-shape in plan view may be adopted.

In the embodiment, the liquid crystal panel 453 of a transmission type in which a light beam incident surface and a light beam emission surface are different is adopted. However, the invention is not limited to this. For example, a liquid crystal panel of a reflection type in which a light incident surface and a light emission surface are the same may be adopted. A light modulating device other than liquid crystal such as a light modulating device that makes use of a device including a micro minor, for example, a DMD (Digital Micromirror Device) may be used as long as the light modulating device is a light modulating device capable of modulating incident light and forming an image corresponding to image information.

In the embodiment, the light source device 41 includes the light source lamp 411 and the reflector 412. However, the invention is not limited to this. That is, the light source device may be a configuration including a solid-state light source such as an LED (Light Emitting Diode). The number of light source devices may be two or more.

In the embodiment, the example is explained in which the partition member 6 is adopted in the projector 1. However, the invention is not limited to this. That is, a partition member having a configuration same as the configuration of the partition member 6 may be applied to an electronic device including an exhaust port.

The invention claimed is:

1. A projector comprising:
an exterior housing including an exhaust port; and
a cooling device provided in the exterior housing and configured to discharge air, which has cooled a cooling target, to an outside of the exterior housing via the exhaust port,
wherein:
the exterior housing includes a partition member that partitions the exhaust port and forms a plurality of openings,
the partition member includes projecting sections projecting from an end edge of at least one of the plurality of openings into an opening,
the partition member includes first partitioning sections and second partitioning sections that form the plurality of openings along a first direction and a second direction orthogonal to each other on a surface orthogonal to a circulating direction of the air circulating from the cooling device toward the exhaust port,
one of the first partitioning sections and the second partitioning sections are disposed to incline with respect to the circulating direction,
the projecting sections are disposed in crossing parts of the first partitioning sections and the second partitioning sections,
in the opening, first projecting sections and second projecting sections of the projecting sections are respectively disposed on one end side and the other end side of a direction orthogonal to the circulating direction,
the first projecting sections and the second projecting sections have different shapes,
an entire portion of each of the first projecting sections is located between a first plane and a second plane and overlaps the one of the first partitioning sections and the second partitioning sections when viewed along the circulating direction, both of the first plane and the second plane are parallel to both of the second direction and the circulating direction,
an entire portion of each of the second projecting sections is located between the first plane and the second plane and overlaps the one of the first partitioning sections and the second partitioning sections when viewed along an opposite direction of the circulating direction, and
the first plane contacts a first end of the one of the first partitioning sections and the second partitioning sections and the second plane contacts a second end of the one of the first partitioning sections and the second partitioning sections, the second end being opposite to the first end.

2. The projector according to claim 1, wherein the projecting sections include inclining surfaces that incline with respect to the circulating direction of the air circulating from the cooling device to the exhaust port.

3. The projector according to claim 2, wherein
the projecting sections are formed in a substantially pyramid shape, and
the inclining surfaces incline such that a sectional area of the projecting sections on a downstream side in the circulating direction is larger than a sectional area of the projecting sections on an upstream side in the circulating direction.

4. The projector according to claim 3, wherein
the opening in which the projecting sections are disposed among the plurality of openings is formed in a substantially rectangular shape,
the projecting sections including the inclining surfaces are respectively disposed at two corners on one end side in the opening, and
the inclining surfaces of the projecting sections disposed at the two corners are opposed to each other.

5. A projector comprising:
an exterior housing including an exhaust port; and
a cooling device provided in the exterior housing and configured to discharge air, which has cooled a cooling target, to an outside of the exterior housing via the exhaust port,
wherein:
the exterior housing includes a partition member that partitions the exhaust port and forms a plurality of openings,
the partition member includes projecting sections projecting from an end edge of at least one of the plurality of openings into an opening,
the partition member includes first partitioning sections and second partitioning sections that form the plurality of openings along a first direction and a second direction orthogonal to each other on a surface orthogonal to a circulating direction of the air circulating from the cooling device toward the exhaust port,
one of the first partitioning sections and the second partitioning sections are disposed to incline with respect to the circulating direction,
the projecting sections are disposed in crossing parts of the first partitioning sections and the second partitioning sections,
in the opening, first projecting sections and second projecting sections of the projecting sections are respectively disposed on one end side and the other end side of a direction orthogonal to the circulating direction,
the first projecting sections and the second projecting sections have different shapes,
an entire portion of each of the first projecting sections is located between a first plane and a second plane and overlaps the one of the first partitioning sections and the second partitioning sections when viewed along the circulating direction, both of the first plane and the second plane are parallel to both of the second direction and the circulating direction,
an entire portion of each of the second projecting sections is located between the first plane and the second plane and overlaps the one of the first partitioning sections and the second partitioning sections when viewed along an opposite direction of the circulating direction,
the first plane contacts a first end of the one of the first partitioning sections and the second partitioning sections and the second plane contacts a second end of the one of the first partitioning sections and the second partitioning sections, the second end being opposite to the first end, and a gap is provided between each of two first projecting sections and a distance of each gap increases toward the first direction.

6. The projector according to claim 5, wherein the projecting sections include inclining surfaces that incline with respect to the circulating direction of the air circulating from the cooling device to the exhaust port.

7. The projector according to claim 6, wherein the projecting sections are formed in a substantially pyramid shape, and the inclining surfaces incline such that a sectional area of the projecting sections on a downstream side in the circulating direction is larger than a sectional area of the projecting sections on an upstream side in the circulating direction.

8. The projector according to claim 7, wherein the opening in which the projecting sections are disposed among the plurality of openings is formed in a substantially rectangular shape, the projecting sections including the inclining surfaces are respectively disposed at two corners on one end side in the opening, and the inclining surfaces of the projecting sections disposed at the two corners are opposed to each other.

\* \* \* \* \*